US012637063B2

(12) United States Patent
Saito et al.

(10) Patent No.: US 12,637,063 B2
(45) Date of Patent: May 26, 2026

(54) VEHICLE CONTROL DEVICE

(71) Applicant: Hitachi Astemo, Ltd., Hitachinaka (JP)

(72) Inventors: Takayuki Saito, Tokyo (JP); Masashi Seimiya, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 67 days.

(21) Appl. No.: 18/697,510

(22) PCT Filed: Aug. 22, 2022

(86) PCT No.: PCT/JP2022/031534
§ 371 (c)(1),
(2) Date: Apr. 1, 2024

(87) PCT Pub. No.: WO2023/058344
PCT Pub. Date: Apr. 13, 2023

(65) Prior Publication Data
US 2024/0418855 A1    Dec. 19, 2024

(30) Foreign Application Priority Data
Oct. 4, 2021    (JP) ................................. 2021-163594

(51) Int. Cl.
*B60W 30/06* (2006.01)
*B62D 15/02* (2006.01)

(52) U.S. Cl.
CPC ......... *B60W 30/06* (2013.01); *B62D 15/0285* (2013.01); *B60W 2556/45* (2020.02); *B60W 2556/50* (2020.02)

(58) Field of Classification Search
CPC .......... B60K 28/00–165; B60W 30/06; B60W 30/12–182; B60W 50/082;
(Continued)

(56) References Cited

U.S. PATENT DOCUMENTS

| | | | | |
|---|---|---|---|---|
| 10,216,193 | B2 * | 2/2019 | Gupta | .................. G05D 1/0234 |
| 12,246,746 | B2 * | 3/2025 | Yamamoto | ....... G08G 1/096811 |
| 2019/0080612 | A1 * | 3/2019 | Weissman | ............. G01S 13/758 |

FOREIGN PATENT DOCUMENTS

| | | |
|---|---|---|
| JP | 2006-072431 A | 3/2006 |
| JP | 2019-139322 A | 8/2019 |

(Continued)

OTHER PUBLICATIONS

International Search Report with English Translation and Written Opinion of International Patent Application No. PCT/JP2022/031534 dated Nov. 1, 2022 (9 pages).

*Primary Examiner* — Mark L. Greene
(74) *Attorney, Agent, or Firm* — Foley & Lardner LLP

(57) ABSTRACT

A vehicle control device 200 comprises: a marker detection unit 206 that uses a radio wave receiver 116 provided in a vehicle and receives a radio wave from a marker placed at a predetermined point to detect the marker; a vehicle behavior modification unit 210 that modifies a vehicle behavior such that the marker detection unit 206 detects the marker; a storage unit 204 that stores in advance a position of the marker; and a positional deviation determination unit 208 that determines whether there is a positional deviation of the marker, on the basis of a position of the marker detected by the marker detection unit 206 and the position of the marker stored in the storage unit 204.

7 Claims, 13 Drawing Sheets

(58) Field of Classification Search
CPC .......... B60W 2556/45; B60W 2556/50; B62D
15/0285; G05D 1/0061; G05D 1/0088;
G05D 1/021; G05D 1/0214; G05D
1/0221; G05D 1/0223
See application file for complete search history.

(56) References Cited

FOREIGN PATENT DOCUMENTS

| | | | |
|---|---|---|---|
| JP | 2020-091255 | A | 6/2020 |
| JP | 2020-203583 | A | 12/2020 |

* cited by examiner

Figure 9:
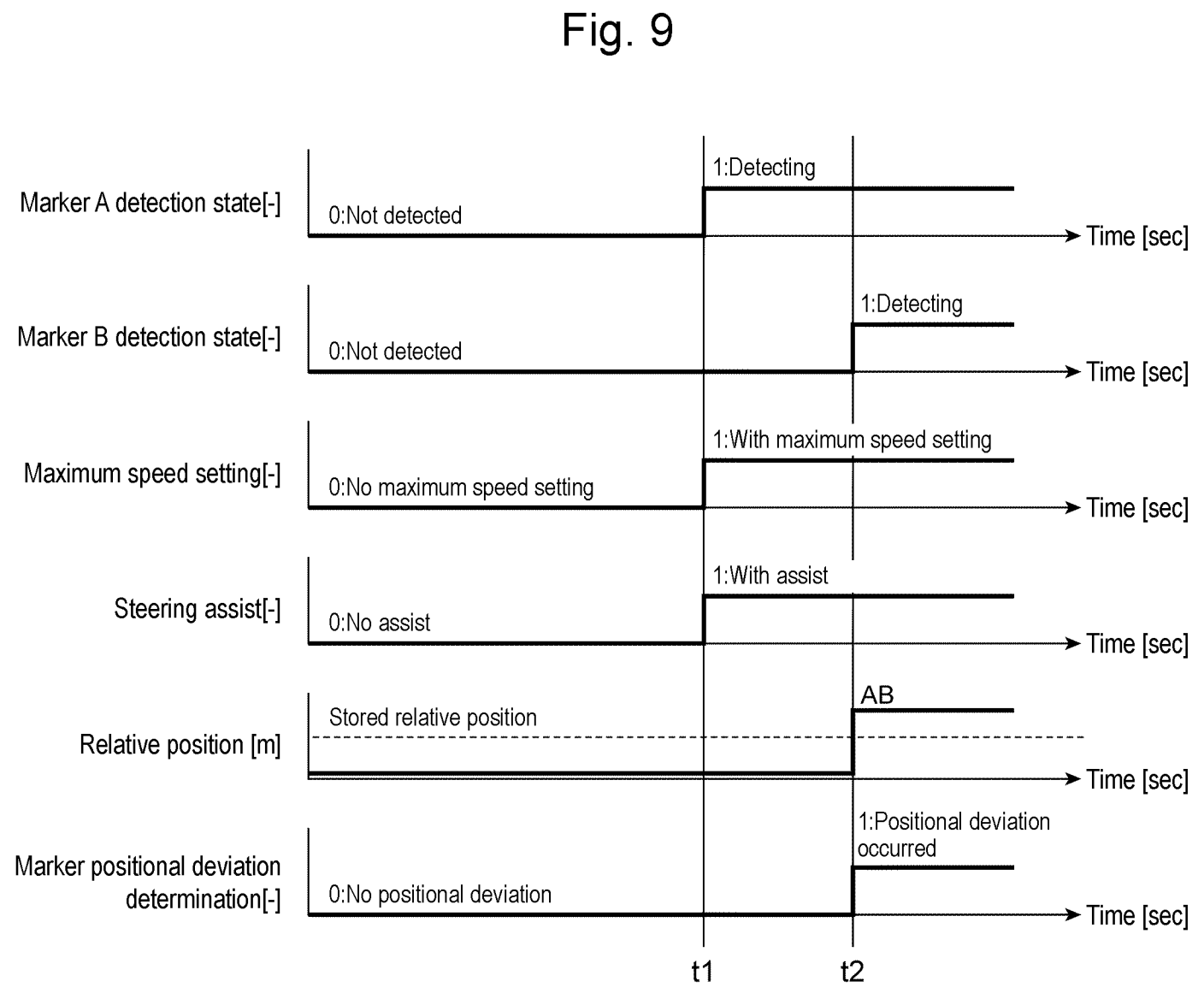

Marker A detection state[-]

0:Not detected

1:Detecting

→ Time [sec]

Marker B detection state[-]

0:Not detected

1:Detecting

→ Time [sec]

Maximum speed setting[-]

0:No maximum speed setting

1:With maximum speed setting

→ Time [sec]

Steering assist[-]

0:No assist

1:With assist

→ Time [sec]

Relative position [m]

Stored relative position

AB

→ Time [sec]

Marker positional deviation determination[-]

0:No positional deviation

1:Positional deviation occurred

→ Time [sec]

t1    t2

VEHICLE CONTROL DEVICE

TECHNICAL FIELD

The present invention relates to a vehicle control device.

The present application claims the benefit of priority from Japanese Patent Application No. 2021-163594 filed on Oct. 4, 2021, the entire contents of which are incorporated herein by reference.

BACKGROUND ART

Conventionally, there is known a vehicle control device that controls traveling of a vehicle with respect to the position of a wireless transmitter (for example, marker) that incorporates Bluetooth (registered trademark). Since the marker that incorporates Bluetooth 5.1 (direction finding feature) has allowed position measurement with accuracy of a few centimeters, it is now utilized for high accuracy positioning and low-speed autonomous driving. The marker can be placed at a desired location, such as a landmark and a home gate, and can be replaced easily. In addition, the position of the marker can be stored on the vehicle side. However, any displacement of the position of the placed marker may cause a deviation in positioning, resulting in a potential collision with an obstacle during the low-speed autonomous driving.

To solve such issues, various techniques have been proposed. For example, Patent Literature 1 discloses a technique of comparing the coordinates, images, or the like of a stored landmark with those of a detected landmark and, if there is any difference, detecting that the landmark has an abnormality, and repairing the abnormality of the landmark. Patent Literature 2 discloses a parking control technique of adjusting the position of a vehicle during parking on the basis of a plurality of markers.

CITATION LIST

Patent Literature

Patent Literature 1: JP 2020-203583 A
Patent Literature 2: JP 2020-091255 A

SUMMARY OF INVENTION

Technical Problem

However, the technique disclosed in Patent Literature 1 relates to detection of an abnormality of a placed landmark, not to detection of an abnormality of a placed marker that incorporates Bluetooth 5.1 (direction finding feature). In addition, the technique disclosed in Patent Literature 1 does not relate to a driving assistance system using markers, and thus cannot detect a positional deviation of a marker caused by its displacement, which may lead to unexpected driving assistance. Likewise, the technique disclosed in Patent Literature 2 does not relate to a positional deviation of a marker, and thus cannot detect a positional deviation of a marker caused by its displacement, which may lead to unexpected driving assistance. In other words, in the techniques disclosed in Patent Literature 1 and 2, there still remains a likelihood of occurrence of erroneous operation of a vehicle caused by the positional deviation of the marker.

The present invention has been made to solve the above technical issues, and it is an object of the present invention to provide a vehicle control device that can detect any positional deviation of a placed wireless transmitter and avoid erroneous operation of a vehicle caused by the positional deviation of the wireless transmitter.

Solution to Problem

A vehicle control device according to the present invention includes: a wireless transmitter detection unit that uses a radio wave receiver provided in a vehicle and receives a radio wave from a wireless transmitter placed at a predetermined point to detect the wireless transmitter; a vehicle behavior modification unit that modifies a vehicle behavior such that the wireless transmitter detection unit detects the wireless transmitter; a storage unit that stores in advance a position of the wireless transmitter; and a positional deviation determination unit that determines whether there is a positional deviation of the wireless transmitter, on the basis of a position of the wireless transmitter detected by the wireless transmitter detection unit and the position of the wireless transmitter stored in the storage unit.

In the vehicle control device according to the present invention, the vehicle behavior modification unit modifies the vehicle behavior such that the wireless transmitter detection unit detects a wireless transmitter, and thus the wireless transmitter detection unit can more smoothly detect a wireless transmitter. In addition, the positional deviation determination unit determines whether there is a positional deviation of the wireless transmitter, on the basis of the position of the wireless transmitter detected by the wireless transmitter detection unit and the position of the wireless transmitter stored in the storage unit, and thus if there is a positional deviation of the wireless transmitter, the positional deviation determination unit can detect the positional deviation. Accordingly, the vehicle control device according to the present invention can avoid erroneous operation of the vehicle caused by the positional deviation of the wireless transmitter.

Advantageous Effects of Invention

According to the present invention, it is possible to detect any positional deviation of a placed wireless transmitter and avoid erroneous operation of a vehicle caused by the positional deviation of the wireless transmitter.

BRIEF DESCRIPTION OF DRAWINGS

FIG. 1 is a schematic diagram illustrating a vehicle incorporating a vehicle control device according to an embodiment.

FIG. 9 is a time chart of the positional deviation determination process illustrated in FIG. 8.

DESCRIPTION OF EMBODIMENTS

Hereinafter, an embodiment of a vehicle control device according to the present invention will be described with reference to the drawings. In the description of the drawings, identical elements are denoted by identical reference signs, and repeated description thereof will be omitted. In the following description, the directions and positions indicated by front, rear, right, or left are based on the vehicle incorporating the vehicle control device. Further, in the following description, the vehicle incorporating the vehicle control device may be referred to as the "host vehicle."

A vehicle control device 200 of the present embodiment is a device mounted on a vehicle 100 to perform autonomous driving of the vehicle 100 or driving assistance to the vehicle 100. In the following description, although the vehicle 100 as a passenger vehicle will be described by way of example, the vehicle 100 is not limited to the passenger vehicle, and may be a bus, a truck, a trailer, or the like.

Figure 1:
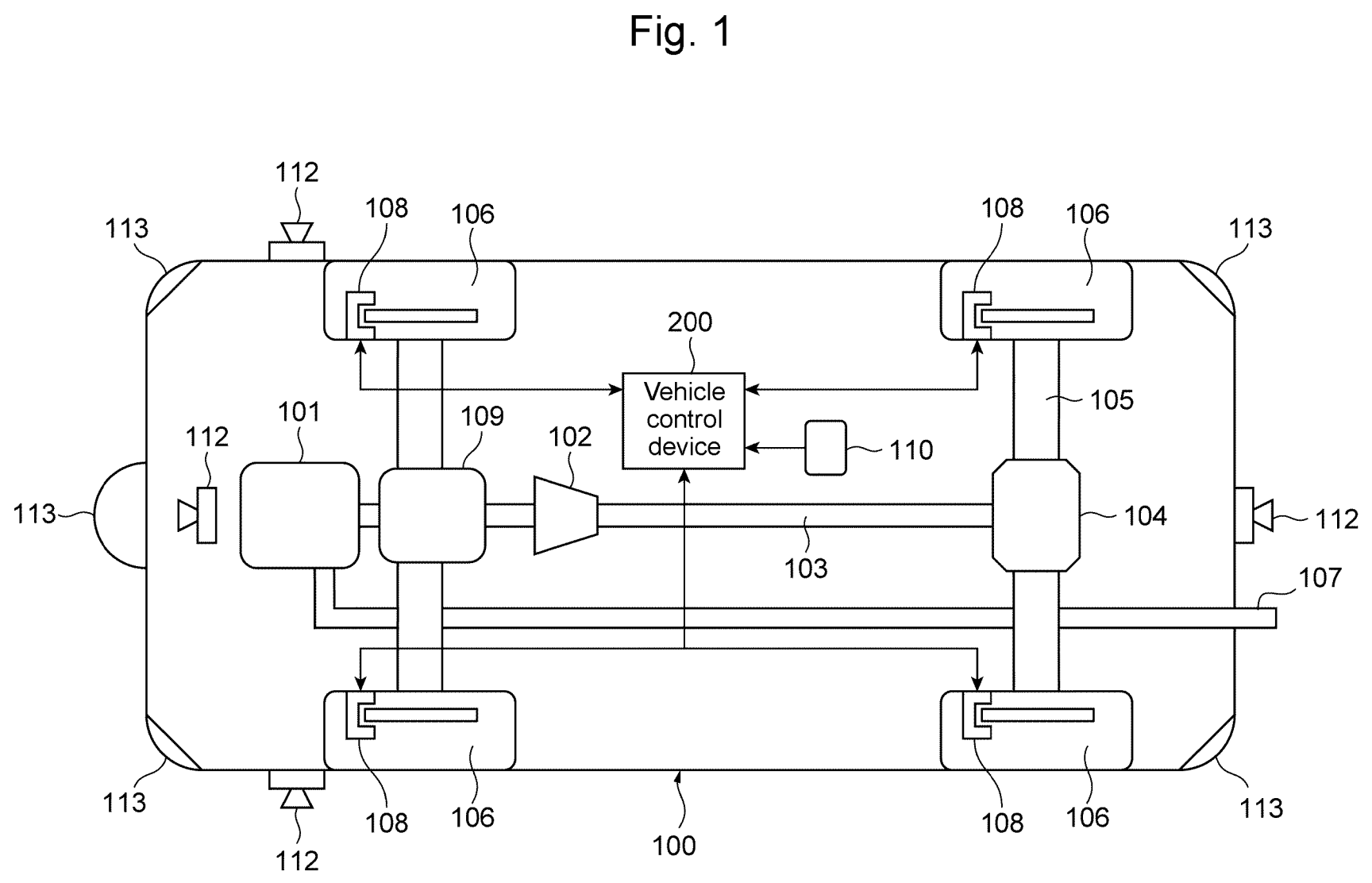
Figure 2:
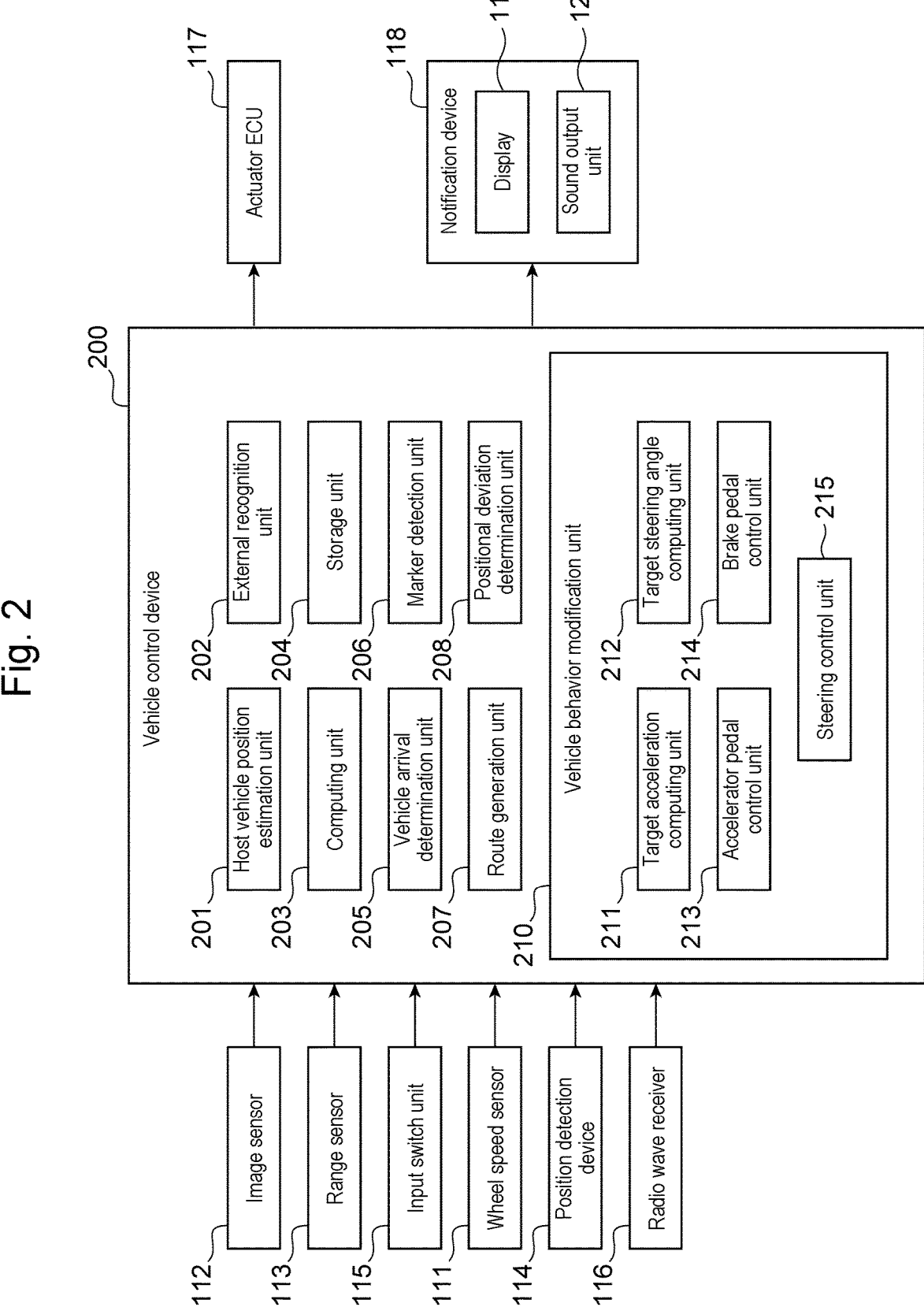
FIG. 2 is a block diagram illustrating the vehicle control device according to the embodiment.

FIG. 1 is a schematic diagram illustrating a vehicle incorporating a vehicle control device according to an embodiment. FIG. 2 is a block diagram illustrating the vehicle control device according to the embodiment. As illustrated in FIG. 1, the vehicle 100 is a rear drive vehicle, for example, and includes an in-cylinder injection gasoline engine 101 as a traveling power source, an automatic transmission 102 that can get closer to and away from the gasoline engine 101, a propeller shaft 103, a differential gear 104, a drive shaft 105, four wheels 106, an exhaust pipe 107, a brake device 108 provided for each of the wheels 106, and an electric power steering 109.

Note that the vehicle 100 illustrated in FIG. 1 is an example of the vehicle to which the vehicle control device 200 of the present embodiment is applied, and the present embodiment does not limit the configuration of the vehicle to which the vehicle control device 200 is applied. For example, the vehicle 100 may be a vehicle employing a continuously variable transmission (CVT) instead of the automatic transmission 102. In addition, the traveling power source of the vehicle 100 is not limited to the gasoline engine 101, and may be a diesel engine, a natural gas engine, or an electric motor.

The vehicle 100 includes the vehicle control device 200 and a sensor group 110, actuators, various instruments, and the like, which are configured to transmit and receive signals and data to and from each other through in-vehicle LAN or CAN communication. The vehicle control device 200 generates command values for implementing driving assistance on the basis of the internal and external information of the vehicle 100 detected by the sensor group 110, outputs the generated command values to the gasoline engine 101, the brake device 108, the electric power steering 109, and the automatic transmission 102, and the like, and performs autonomous driving or driving assistance.

Examples of the sensor group 110 include a wheel speed sensor 111, an image sensor 112, a range sensor 113, and a position detection device 114 (see FIG. 2). The wheel speed sensor 111 is provided for each of the wheels 106, and is configured to detect a rotational speed of the wheel 106 and output the detection result to the vehicle control device 200.

Specifically, the wheel speed sensor 111 generates a pulse waveform in accordance with the rotation of the wheel 106, and outputs the generated pulse waveform to the vehicle control device 200.

The image sensor 112 corresponds to an "external environment sensor" recited in the scope of the claims, and the image sensors 112 are disposed on the front, rear, right, and left sides of the vehicle 100. The image sensor 112 includes a monocular camera or a stereo camera, and is configured to capture images of the surrounding environment of the vehicle 100 (for example, objects around the vehicle 100, road environment such as white lines), and output the captured images to the vehicle control device 200. For example, the image sensor 112 detects a white line or an object ahead of the vehicle 100, and detects the distance between the host vehicle and the object or the speeds thereof from the distinction between a host vehicle travel lane and the other lane adjacent to the host vehicle travel lane or differential information of the object detected by the right and left cameras. Note that this image sensor 112 may also be used as a range sensor, which will be described later.

The range sensor 113 corresponds to an "external environment sensor" recited in the scope of the claims, and the range sensors 113 are disposed on the front and rear sides of the vehicle 100 and on the four corners of the vehicle 100. The range sensor 113 includes, for example, a radar or lidar, and is configured to detect the distance to the object around the vehicle 100 and output the detection result to the vehicle control device 200. More specifically, the range sensor 113 transmits a millimeter wave or radio wave toward the surrounding environment of the vehicle 100 and receives its reflected wave to detect the distance to the object, and outputs the detection result to the vehicle control device 200.

The position detection device 114 includes a direction sensor for measuring the front direction of the vehicle 100, a GNSS (Global Navigation Satellite System) receiver for measuring the position of the vehicle 100 on the basis of radio waves from positioning satellites, and the like. The position detection device 114 outputs the detected position of the vehicle 100 to the vehicle control device 200.

The vehicle control device 200 is configured as a microcomputer including, for example, a CPU (Central Processing Unit) that executes computation, a ROM (Read Only Memory) as a secondary storage that stores a program for the computation, a RAM (Random Access Memory) as a temporary storage that stores a calculation process and temporary control variables. The vehicle control device 200 executes the stored program to perform various control over the vehicle 100.

As illustrated in FIG. 2, the vehicle control device 200 is electrically connected to the wheel speed sensor 111, the image sensor 112, the range sensor 113, the position detection device 114, the input switch unit 115, the radio wave receiver 116, the actuator ECU 117, and the notification device 118. On the basis of the input results from the wheel speed sensor 111, the image sensor 112, the range sensor 113, the position detection device 114, the input switch unit 115, and the radio wave receiver 116, the vehicle control device 200 generates command values for controlling the actuator ECU 117 and the notification device 118, and outputs the generated command values to the actuator ECU 117 and the notification device 118.

Note that in FIG. 2, the position detection device 114 and the radio wave receiver 116 are configured to be electrically connected directly to the vehicle control device 200. However, the position detection device 114 and the radio wave receiver 116 may be configured to be connected to another ECU and electrically connected to the vehicle control device 200 via CAN or Ethernet or the like.

The input switch unit 115 is a switch for receiving various instructions entered through the operation by a user (for example, driver) (for example, an instruction to start constant-speed traveling at a set target speed or an instruction to stop the constant-speed traveling, or the like). This input switch unit 115 may be a dedicated mechanical switch provided around the driver's sheet, or may be a GUI (Graphical User Interface) switch or the like.

The radio wave receiver 116 receives a radio wave from the radio wave transmitter (for example, marker) placed at a predetermined point such as a road, and outputs the received radio wave to the vehicle control device 200.

Examples of the actuator ECU 117 include mechanical elements, such as an accelerator pedal for controlling a drive force, a brake pedal for controlling a braking force, a parking brake, a steering for controlling a traveling direction of the vehicle 100, and a shift lever for controlling the traveling direction of the vehicle 100, and a signal converter.

The notification device 118 is a device for notifying a user of various information, and includes a display 119 and a sound output unit 120. The display 119 includes, for example, a liquid crystal display, and causes the liquid crystal display to display the various information to notify the user of the information. The sound output unit 120 includes, for example, a speaker, and provides voice guidance or attention attraction to the user via the speaker. The notification device 118 may also be configured to notify the user of the information through color change in a mirror attached to the vehicle 100 or vibration of the steering, or the like.

The vehicle control device 200 includes a host vehicle position estimation unit 201, an external recognition unit 202, a computing unit 203, a storage unit 204, a vehicle arrival determination unit 205, a marker detection unit 206, a route generation unit 207, a positional deviation determination unit 208, and a vehicle behavior modification unit 210.

The host vehicle position estimation unit 201 estimates a position of the host vehicle on the basis of the detection result obtained by the position detection device 114.

The external recognition unit 202 recognizes an object around the vehicle 100 on the basis of images captured by the image sensor 112. For example, the external recognition unit 202 recognizes objects around the vehicle 100, such as other vehicles, a fence, a gate, or a specific landmark, from the images captured by the image sensor 112. In addition, the external recognition unit 202 converts the position of the host vehicle estimated by the host vehicle position estimation unit 201 into a coordinate system set in advance.

The computing unit 203 performs various calculations related to the control of the vehicle control device 200. For example, on the basis of the position of the host vehicle estimated by the host vehicle position estimation unit 201 and the information of the objects recognized by the external recognition unit 202, such as other vehicles, a fence, a gate, or a specific landmark, the computing unit 203 calculates relative positions of the host vehicle and these objects or relative distances therebetween. At this time, the computing unit 203 calculates the relative positions of the host vehicle and the objects ahead of the host vehicle, as well as the objects on the rear, right, and left sides of the host vehicle, or relative distances therebetween. In addition, the computing unit 203 calculates, for a plurality of markers, a relative position or relative distance between markers, and also a relative position of a marker and a specific landmark or relative distance therebetween.

The storage unit 204 stores various information related to the control of the vehicle control device 200. For example, the storage unit 204 stores positions of a plurality of markers placed in the vicinity of the home of the user of the vehicle 100, a detection range of each marker, a relative position between markers, a relative position of a marker and a landmark placed in the vicinity of the marker, and the like. In addition, the storage unit 204 stores various results calculated by the computing unit 203. Further, the storage unit 204 stores a detection result of the marker received by the radio wave receiver 116. Examples of the marker detection result include a position of the marker, a relative position of the host vehicle and the marker or relative distance therebetween.

The vehicle arrival determination unit 205 determines whether or not the host vehicle has arrived in the marker detection range stored in the storage unit 204, on the basis of the position of the host vehicle estimated by the host vehicle position estimation unit 201. The vehicle arrival determination unit 205 may determine whether or not the host vehicle has arrived in the marker detection range using the relative position or relative distance between the markers stored in the storage unit 204, or using both of the position of the host vehicle estimated by the host vehicle position estimation unit 201 and the relative position or relative distance between the markers stored in the storage unit 204. Preferably, the determination of whether the host vehicle has arrived in the marker detection range is made in consideration of an error of a few millimeters to a few meters.

The marker detection unit 206 corresponds to a "wireless transmitter detection unit" recited in the scope of the claims, and the marker detection unit 206 is configured to detect a marker on the basis of the receiving result obtained by the radio wave receiver 116. When the marker is detected, the marker detection unit 206 acquires a position of the marker, and a relative position of the marker and the vehicle 100 or relative distance therebetween. Note that in the present embodiment, the marker corresponds to the wireless transmitter and may also be referred to as a beacon.

The route generation unit 207 calculates a travel route of the host vehicle. For example, the route generation unit 207 generates a travel route of the vehicle 100 on the basis of the results obtained by the host vehicle position estimation unit 201, the external recognition unit 202, and the storage unit 204. After the travel route of the host vehicle is generated, the vehicle 100 may perform autonomous driving along the generated travel route or the driver may manually drive the vehicle 100 along the generated travel route. Note that when the driver manually drives the vehicle 100, the generated route may be displayed by the notification device 118.

The positional deviation determination unit 208 determines whether there is a marker positional deviation, on the basis of the position of the marker detected by the marker detection unit 206 and the position of the marker stored in the storage unit 204. In addition, the positional deviation determination unit 208 determines whether there is a marker positional deviation by comparing the relative position or relative distance between the markers calculated by the computing unit 203 with the relative position or relative distance between the markers stored in the storage unit 204. Further, the positional deviation determination unit 208 determines whether there is a marker positional deviation by comparing the relative position of the marker and the landmark or relative distance therebetween calculated by the computing unit 203 with the relative position of the marker and the landmark or relative distance therebetween stored in the storage unit 204. Note that when a positional deviation is determined, preferably, a margin of, for example, a few millimeters to a few meters is set.

The vehicle behavior modification unit 210 includes a target acceleration computing unit 211, a target steering angle computing unit 212, an accelerator pedal control unit 213, a brake pedal control unit 214, and a steering control unit 215. The target acceleration computing unit 211 calculates a target acceleration of the host vehicle on the basis of the determination result obtained by the vehicle arrival determination unit 205, for example. The target acceleration computing unit 211 may calculate a target acceleration such that the host vehicle will not accelerate when it arrives in the marker detection range, on the basis of the radio wave from the marker received by the radio wave receiver 116.

The target steering angle computing unit 212 calculates a target steering angle of the host vehicle on the basis of the determination result obtained by the vehicle arrival determination unit 205. The target steering angle computing unit 212 may calculate a target steering angle when the host vehicle has arrived in the marker detection range, on the basis of the radio wave from the marker received by the radio wave receiver 116.

The accelerator pedal control unit 213, the brake pedal control unit 214, and the steering control unit 215 control the operation of the accelerator pedal, the brake pedal, and the steering, respectively.

Hereinafter, referring to FIG. 3A and FIG. 3B, a scene without a marker positional deviation and a scene with a marker positional deviation will be described.

Figure 3A:
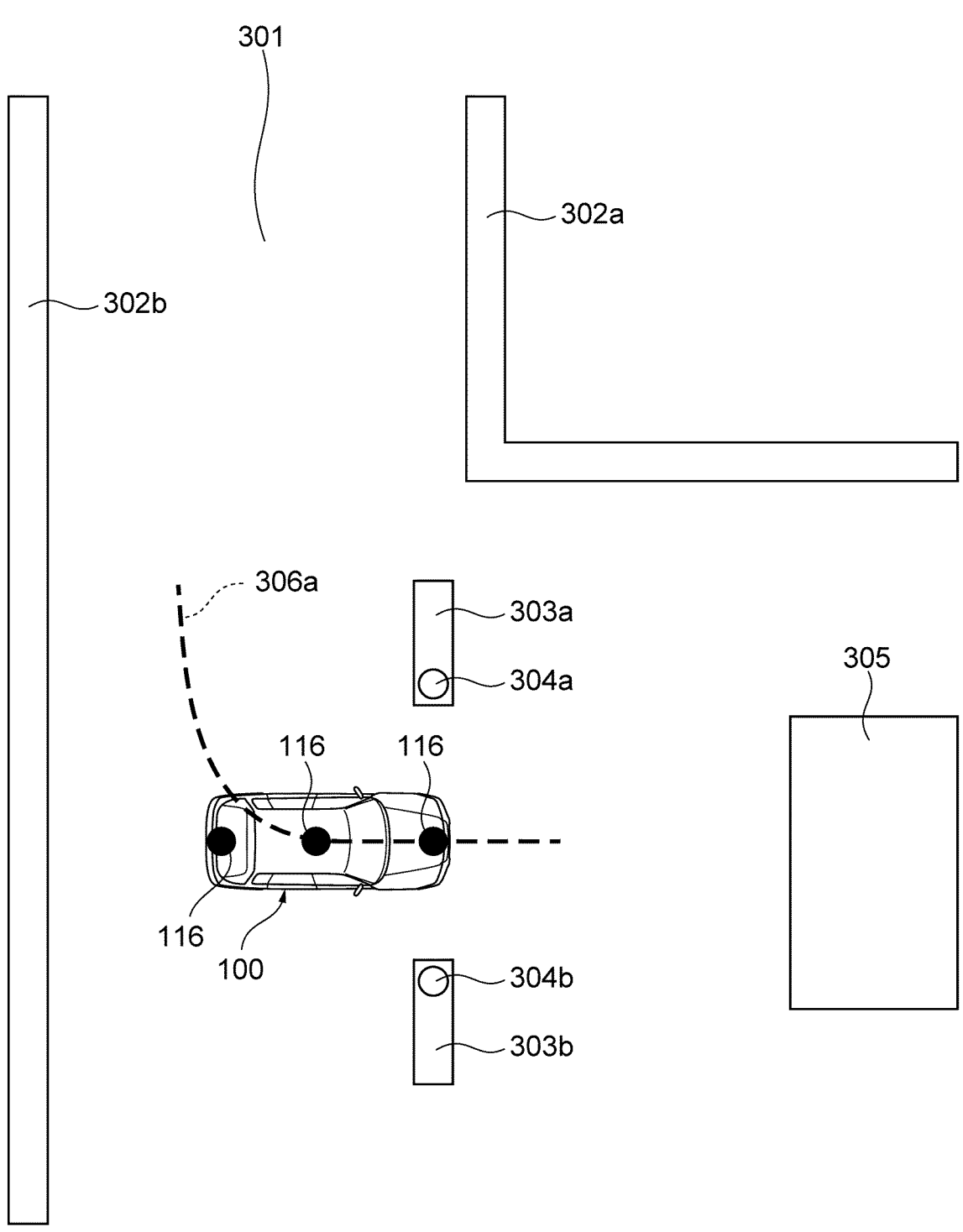
FIG. 3A is a plan view of a scene without a marker positional deviation.
Figure 3B:
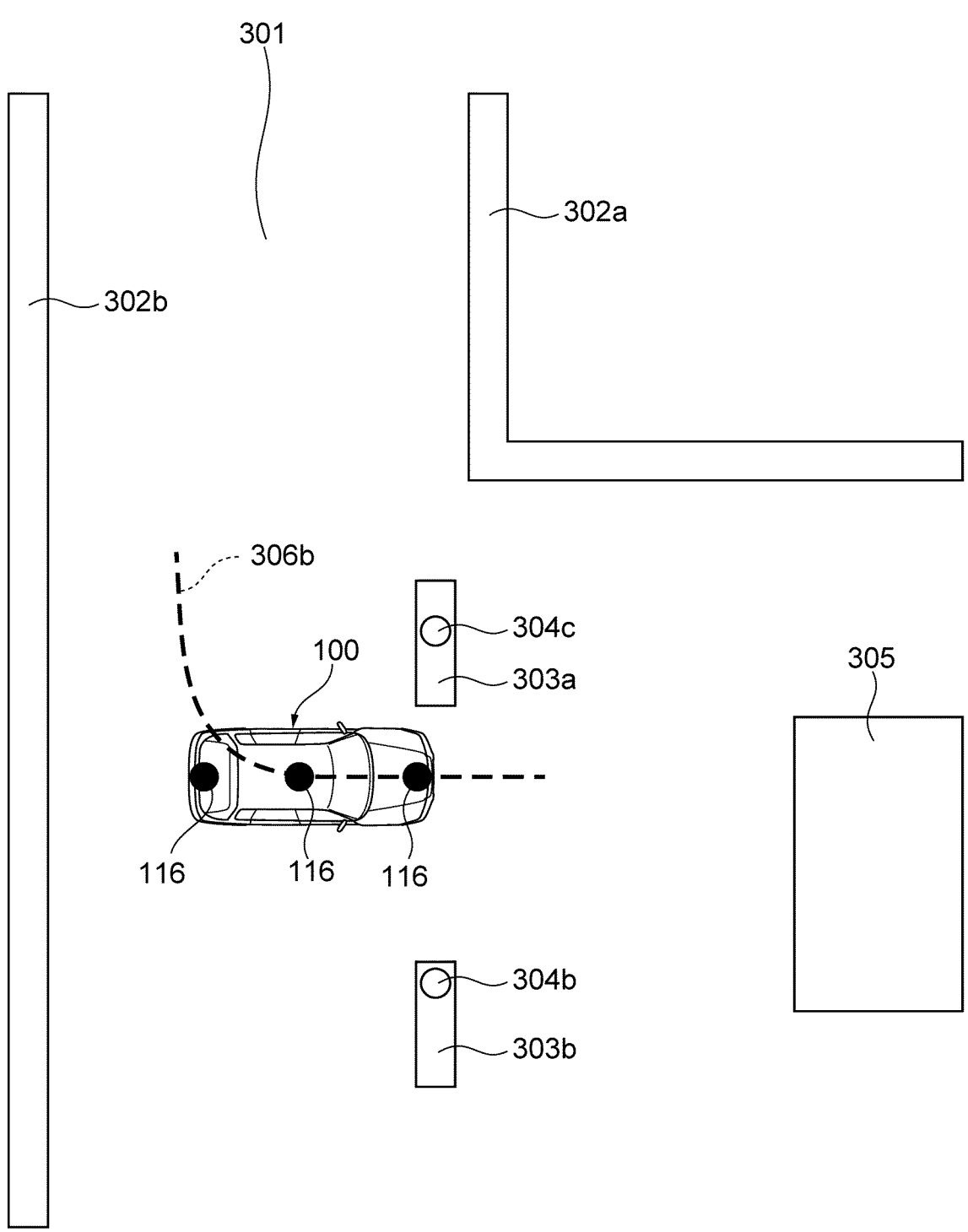
FIG. 3B is a plan view of a scene with a marker positional deviation.

FIG. 3A and FIG. 3B both illustrate a situation of the vehicle 100 returning home. However, the vehicle control device of the present embodiment is not limited to this situation, and may be applied to a situation of the vehicle 100 entering a large-scale parking lot, for example. FIG. 3A illustrates a scene without a marker positional deviation and FIG. 3B illustrates a scene with a marker positional deviation.

In FIG. 3A and FIG. 3B, the reference sign 301 shows a road around the home. The road 301 may be in an urban area. Reference signs 302a and 302b show a fence around the home. The fences 302a and 302b may be fences of the urban area or fences of a large-scale parking lot. Reference signs 303a and 303b show a home gate, but may be gates of the large-scale parking lot.

On the gate 303a and the gate 303b, a marker 304a and a marker 304b are placed, respectively. The markers 304a and 304b are markers of the radio wave transmitters without a positional deviation (i.e., placed at a correct position), for example, and are removably placed with a predetermined distance therebetween. Note that the markers 304a and 304b may be placed at a desired location such as on a fence in the urban area, other than on the home gate. Further, the number of markers is not limited to 2, and may be 1, or 3 or more. Meanwhile, a marker 304c illustrated in FIG. 3B is a marker of the radio wave transmitter with a positional deviation (i.e., placed at an incorrect position). The positional deviation is assumed to be induced by human or an external factor such as an animal or wind, for example.

The reference sign 305 shows a home, but may be a large-scale parking lot or a commercial facility such as a shopping mall, other than the home.

As illustrated in FIG. 3A, three radio wave receivers 116 capable of receiving radio waves from the markers 304a and 304b are disposed in the vehicle 100. These three radio wave receivers 116 are respectively disposed in the front, center, and rear parts of the vehicle, for example. Such arrangement allows receiving the radio waves from the markers in a wider area. Note that one radio wave receiver 116 need be disposed, but disposing a plurality of radio wave receivers 116 will produce an effect of increasing the accuracy of acquiring the positions of the markers 304a and 304b.

The reference sign 306a in FIG. 3A and the reference sign 306b in FIG. 3B each show a travel route generated by the route generation unit 207. The travel route 306a is a route in the scene without a positional deviation of the markers 304a and 304b. The vehicle 100 can travel along the travel route 306a without colliding with the gates 303a and 303b. Meanwhile, the travel route 307b is a route in the scene with a positional deviation of the marker 303c. The vehicle 100 may collide with the gates 303a and 303b when traveling along the travel route 307b. Note that the route generation by the route generation unit 207 may be performed in the vicinity of the gates 303a and 303b, or may be performed in the urban area away from the home 305. In addition, when the vehicle 100 enters the large-scale parking lot, the route generation by the route generation unit 207 may be performed in the vicinity of the gate of the large-scale parking lot.

Figure 4:
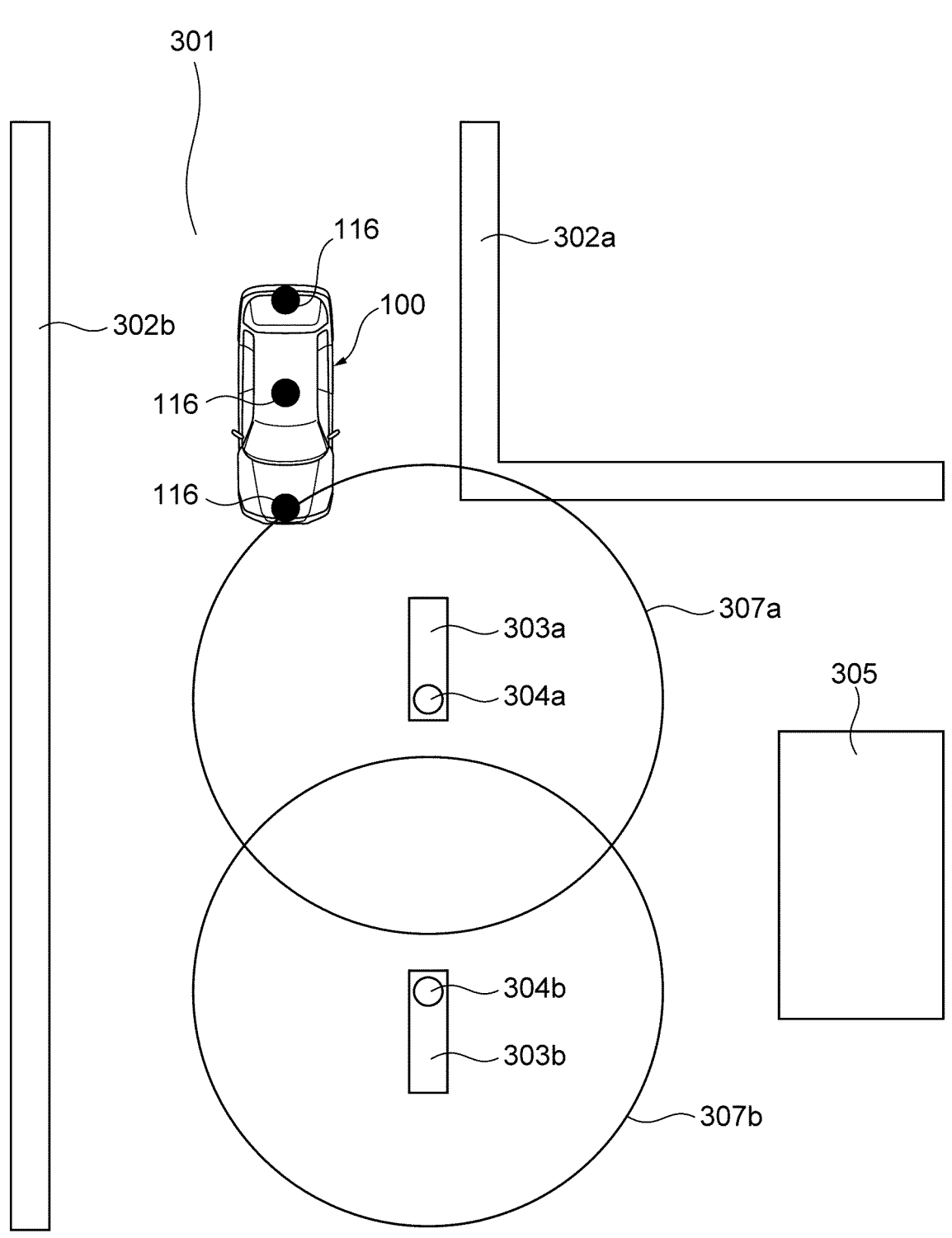
FIG. 4 is a view for describing a marker detection range.

FIG. 4 is a view for describing the marker detection range. In FIG. 4, the reference sign 307a shows a detection range of the marker 304a, and the reference sign 307b shows a detection range of the marker 304b. In the present embodiment, the term "marker detection range" is used to mean the same as a transmission range of a marker. In other words, when the radio wave receiver 116 provided in the vehicle 100 enters the transmission range of the marker, the radio wave receiver 116 can receive a radio wave transmitted by the marker, thus allowing the radio wave receiver 116 to detect the marker transmitting the radio wave.

In the vehicle control device 200 of the present embodiment, the vehicle arrival determination unit 205 determines whether or not the host vehicle has arrived near the detection ranges of the markers 304a and 304b, on the basis of the positions and the detection ranges of the markers 304a and 304b stored in the storage unit 204 and on the basis of the position of the host vehicle estimated by the host vehicle position estimation unit 201. If the vehicle arrival determination unit 205 determines that the host vehicle has arrived near the detection ranges of the markers 304a and 304b, the vehicle behavior modification unit 210 can modify the vehicle behavior so as to be able to detect the markers 304a and 304b.

For example, provided that in a state where the coordinates of the host vehicle have been acquired by the GPS (Global Positioning System) among the GNSS, the GPS coordinates of the markers 304a and 304b have been stored in the storage unit 204. In this case, an area near the detection ranges of the markers 304a and 304b can be set to the area within a few millimeters to a few meters from the detection ranges, for example. Then, when the vehicle 100 arrives near the detection ranges of the markers 304a and 304b, the vehicle behavior modification unit 210 modifies the vehicle behavior so as to be able to detect the markers 304a and 304b. For example, the vehicle behavior modification unit 210 assists the speed of the vehicle 100 so as to be able to detect the markers 304a and 304b. Meanwhile, if the markers 304a and 304b cannot be detected even after the vehicle 100 arrives near the detection ranges of the markers 304a and 304b, the vehicle behavior modification unit 210 assists the steering such that the vehicle 100 comes close to the stored GPS coordinates of the markers 304a and 304b.

In the case of autonomous driving, examples of assisting the speed include a method of avoiding acceleration by setting an acceleration of 0, and a method of decelerating to a predetermined speed. Meanwhile, in the case of manual driving, the driver is notified to decelerate with a message or icon prompting the driver to decelerate on the display 119 of the notification device 118 or with a sound from the sound output unit 120. In either case, when the host vehicle speed is high, the host vehicle may pass by the marker without detecting the marker even after the arrival in the marker detection range. Thus, it is desired to modify the host vehicle speed to a speed at which the marker can be detected.

In the case of autonomous driving, examples of assisting the steering include a method of traveling straight-ahead by setting a target steering angle of 0, and a method of causing the host vehicle to approach the marker when the host vehicle is located at the edge of the marker detection range. In the case of manual driving, the driver is notified with a message or icon prompting the driver to travel straight-ahead on the display 119 of the notification device 118 or with a sound from the display 119. In either case, the vehicle 100 may be located at the edge of the detection ranges of the markers 304a and 304b and may pass by the markers 304a and 304b without detecting the markers 304a and 304b. Thus, it is desired to modify the vehicle behavior so as to be able to detect the markers 304a and 304b.

In the present embodiment, when the markers 304a and 304b cannot be detected even if the vehicle arrival determination unit 205 determines that the host vehicle has arrived near the detection ranges of the markers 304a and 304b, on the basis of the positions and the detection ranges of the marker 304a and the marker 304b stored in the storage unit 204 and on the basis of the position of the host vehicle estimated by the host vehicle position estimation unit 201, the positional deviation determination unit 208 determines that there is a positional deviation of the marker 304a and the marker 304b.

The positional deviation determination may be made immediately after the vehicle arrival determination unit 205 determines that the host vehicle has arrived in the marker detection range. However, in consideration of the possibility that the detection range may include an error of a few millimeters to a few meters, for example, the positional deviation determination may be made after the host vehicle is determined to have arrived in the marker detection range and then finishes traveling over the margins of error. In addition, since there is also a possibility that the estimation of the host vehicle position based on the result obtained by the position detection device 114 may include an error, it is desired to set, as a margin, a given distance or time after the host vehicle is determined to have arrived in the marker detection range, and to make the positional deviation determination after the host vehicle completes traveling over the set margin.

Hereinafter, referring to FIG. 5, marker positional deviation determination by the vehicle control device 200 will be described. The control process of the positional deviation determination illustrated in FIG. 5 uses GNSS positions. In addition, in FIG. 5, for example, "marker A" indicates the marker 304a of FIG. 4, and "marker B" indicates the marker 304b of FIG. 4. The GNSS positions of the marker A and the marker B are stored in advance in the storage unit 204.

First, in step S501, the vehicle control device 200 determines whether or not GNSS position information can be acquired by the position detection device 114. If the vehicle control device 200 determines that GNSS position information can be acquired, the control process moves to step S502.

If the vehicle control device 200 determines that GNSS position information cannot be acquired, the control process moves to step S504, which will be described later. Note that the case where GNSS position information cannot be acquired indicates, for example, a scene of a vehicle traveling in a parking lot inside of a building or in an underground parking lot.

In step S502, the vehicle arrival determination unit 205 determines whether or not the host vehicle has arrived in the detection range of the marker A, on the basis of the position of the host vehicle estimated by the host vehicle position estimation unit 201 and on the basis of the position and the detection range of the marker A stored in the storage unit 204. If the vehicle arrival determination unit 205 determines that the host vehicle has arrived in the detection range of the marker A, the control process moves to step S503. If the vehicle arrival determination unit 205 determines that the host vehicle has not arrived in the detection range of the marker A, the control process in step S502 is repeated.

In step S503, as described above, the vehicle behavior modification unit 210 controls (i.e., assists) the speed and/or steering of the vehicle 100 such that the marker detection unit 206 can detect the marker A. With this configuration, for example in a case where the vehicle 100 has arrived in the detection range of the marker A but the radio wave from the marker A is blocked by an obstacle or the like, controlling the speed and/or steering of the vehicle 100 allows detection of the marker A.

In step S504, the vehicle control device 200 determines whether or not the marker A has been detected, on the basis of the detection result obtained by the marker detection unit 206. If the vehicle control device 200 determines that the marker A has been detected, the control process moves to step S505. If the vehicle control device 200 determines that the marker A has not been detected, the control process moves to step S509.

In step S505, the vehicle control device 200 determines whether or not the marker B has been detected, on the basis of the detection result obtained by the marker detection unit 206. If the vehicle control device 200 determines that the marker B has been detected, the control process moves to step S506. If the vehicle control device 200 determines that the marker B has not been detected, the control process moves to step S509. Note that the example herein employs two markers (i.e., the marker A and the marker B). When there are three or more markers, the determination of whether the marker has been detected may be made one by one.

In step S506, the computing unit 203 calculates a relative position AB of the marker A and the marker B, on the basis of the position of the marker A and the position of the marker B detected by the marker detection unit 206. The relative position may be with respect to the GNSS position or may be with respect to the host vehicle. In addition, the relative position may be coordinates or a distance.

The storage unit 204 may store the relative position AB calculated by the computing unit 203 by overwriting the stored relative position or, when there is a sufficient memory capacity, by adding as a newly-calculated relative position without overwriting. When there is no sufficient memory capacity, the storage unit 204 may successively delete the oldest relative position among the stored relative positions. When the stored relative position is deleted, it is desirable that the vehicle control device 200 notify the driver via the notification device 118. The relative position to be stored by overwriting or by adding includes the calculated relative position AB. Further, the individual positions of the detected marker A and marker B may be newly stored.

In step S507, the positional deviation determination unit 208 determines whether the calculated relative position AB is undisplaced from the relative position (the stored relative position) stored in the storage unit 204. If the positional deviation determination unit 208 determines that the calculated relative position AB is undisplaced, the control process moves to step S508. If the positional deviation determination unit 208 determines that the calculated relative position AB is displaced, the control process moves to step S509. The stored relative position may be with respect to the GNSS position or may be with respect to the host vehicle. In addition, as for the stored relative position, the marker can also be stored in the storage unit 204 manually by the driver or a passenger. In addition, the stored relative position may be coordinates or a distance.

In step S508, the vehicle control device 200 determines that there is no positional deviation. In this case, the vehicle control device 200 starts low-speed autonomous driving, and notifies the driver or the like that the low-speed autonomous driving is started via the notification device 118. At this time, the vehicle control device 200 may not start the low-speed autonomous driving, but may continue manual driving.

In step S509, the vehicle control device 200 determines that the positional deviation has occurred. In this case, the vehicle control device 200 does not start the low-speed autonomous driving, and notifies the driver or the like that the low-speed autonomous driving cannot be started via the notification device 118. Note that, for example, when the occurrence of the positional deviation was caused intentionally by the driver or the passenger, the vehicle control device 200 may notify the driver or the like via the notification device 118, and store such information in the storage unit 204. When such information is stored in the storage unit 204, the information may be stored by overwriting or by adding.

Through the above-described control process, a series of the positional deviation determination process ends. Note that the stored relative position related to the positional deviation determination process and the relative position calculated by the computing unit 203 may be deleted or added later by the driver.

Figure 5:
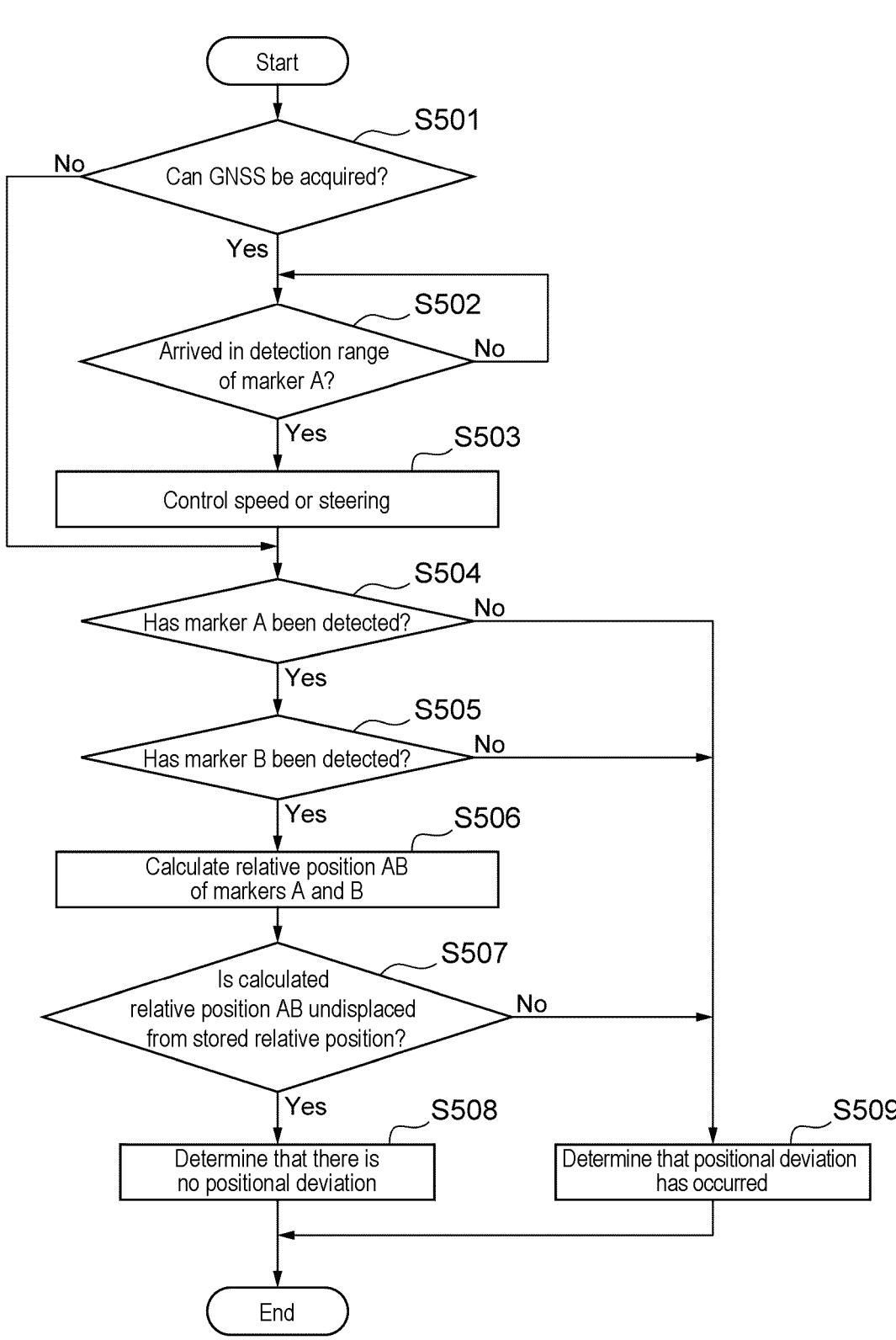
FIG. 5 is a flowchart of marker positional deviation determination by the vehicle control device.
Figure 6:
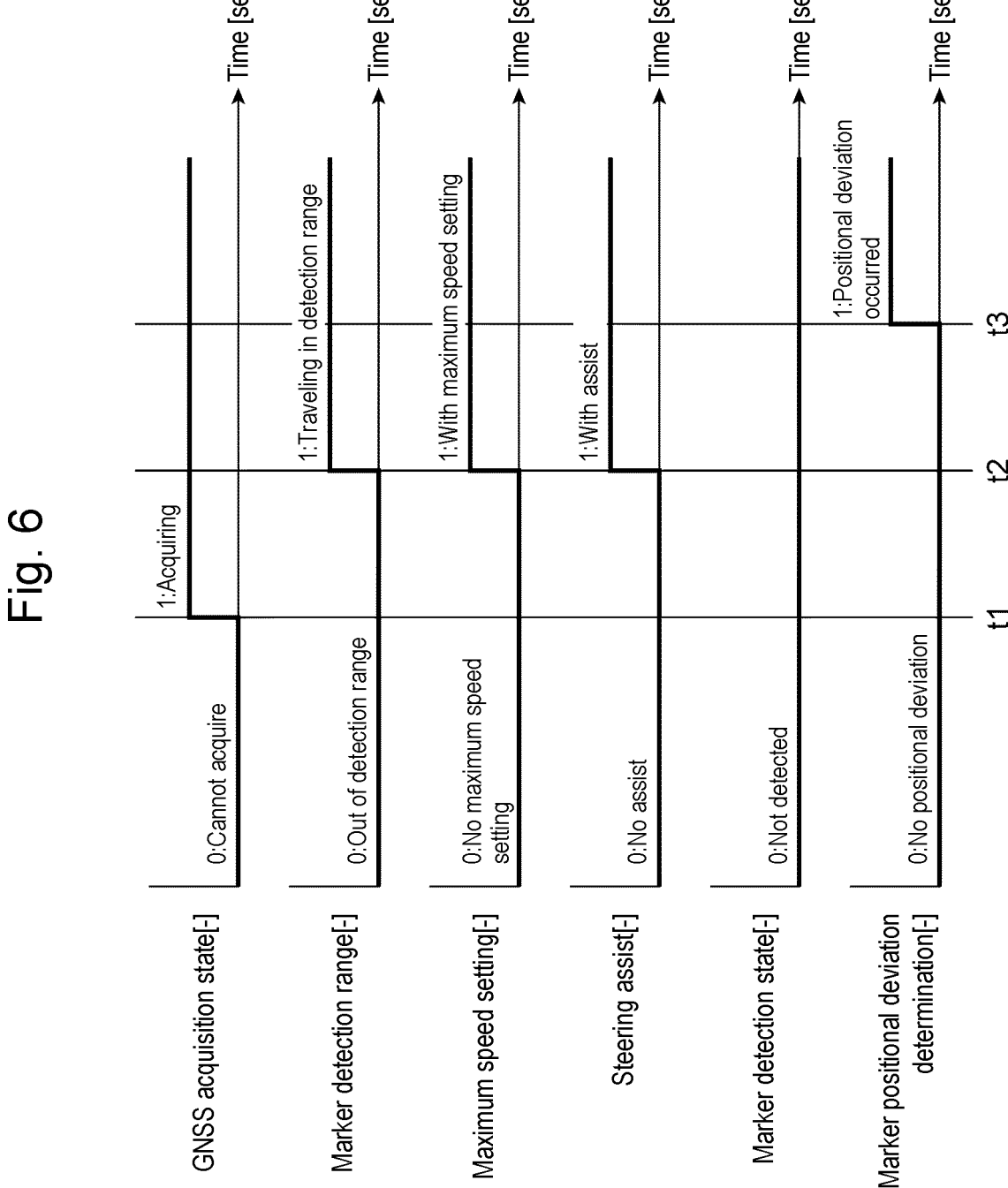
FIG. 6 is a time chart of the positional deviation determination process illustrated in FIG. 5.

FIG. 6 is a time chart of the positional deviation determination process illustrated in FIG. 5. As illustrated in FIG. 6, the scene before a time t1 is a state where GNSS position information cannot be acquired. The time t1 is a scene where GNSS position information is acquired. When GNSS position information is acquired, the vehicle control device 200 turns ON an acquisition flag. At or after the time t1 is a scene of traveling in a state where GNSS position information is being acquired.

A time t2 is a scene where the vehicle 100 has arrived in the marker detection range. That is, the vehicle arrival determination unit 205 determines that the vehicle 100 has arrived in the stored marker detection range with respect to the GNSS position. If the vehicle arrival determination unit 205 determines that the vehicle 100 has arrived in the stored marker detection range, the vehicle control device 200 turns ON an arrival flag. At this time, the vehicle behavior modification unit 210 modifies the vehicle behavior. Specifically, the vehicle behavior modification unit 210 sets the maximum speed and performs steering assist and also turns ON a maximum speed setting flag and a steering assist flag.

At or after the time t2 is a scene of traveling in the stored marker detection range and also a scene where the vehicle behavior is assisted.

A time t3 is a scene where it is determined that the marker positional deviation has occurred. At a time when the vehicle has arrived in the stored marker detection range, if the marker cannot be detected, the positional deviation determination unit 208 can determine that the positional deviation has occurred. However, in consideration of the possibility that the estimation of the host vehicle position, such as the GNSS, may include an error, if the marker cannot be detected after the vehicle has traveled a given distance or time as a margin, the positional deviation determination unit 208 determines that the positional deviation has occurred. If the positional deviation determination unit 208 determines that there is a marker positional deviation (that is, the positional deviation has occurred), the vehicle control device 200 turns ON a marker positional deviation occurrence flag.

Figure 7:
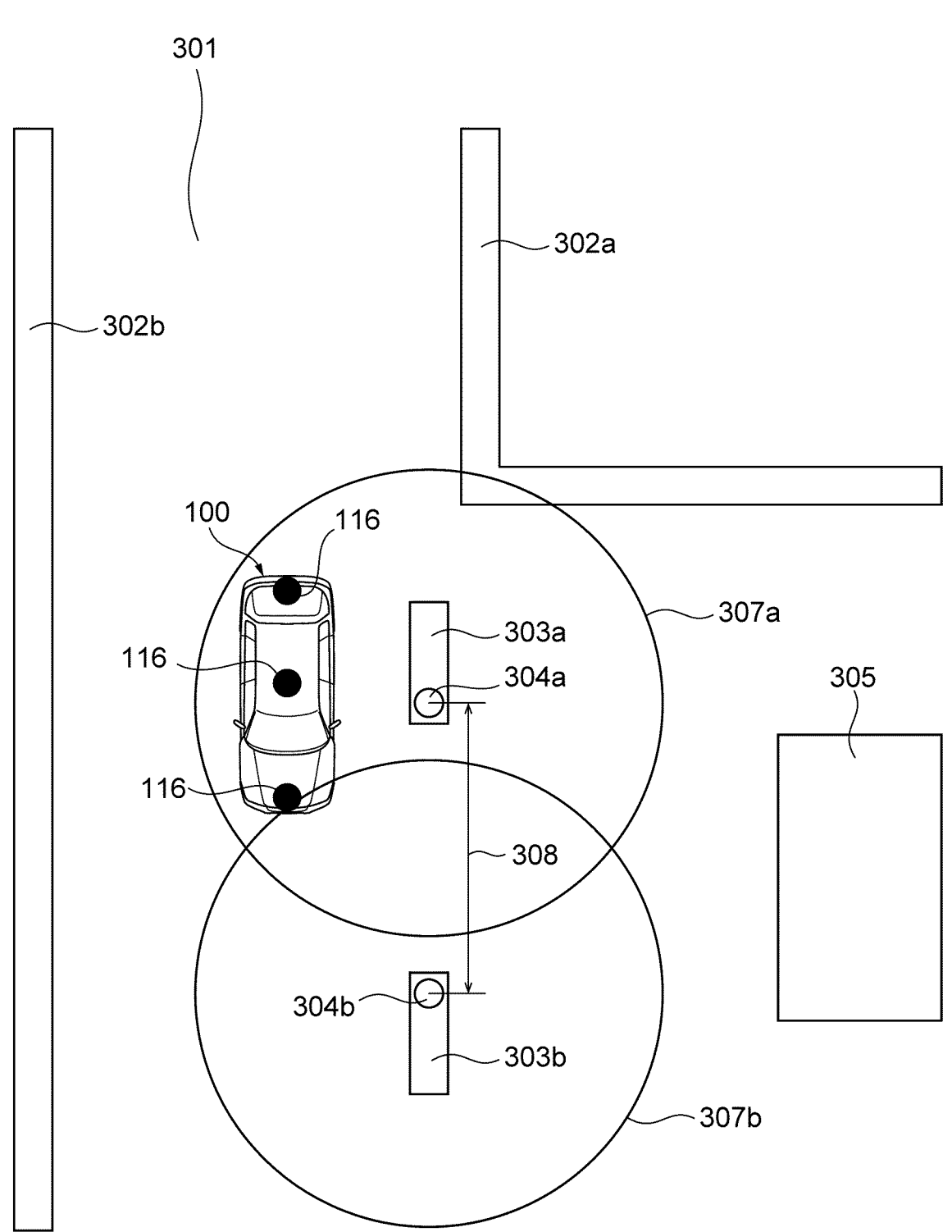
FIG. 7 is a view for describing a relative position of markers.

FIG. 7 is a view for describing a relative position of markers. The reference sign 308 in FIG. 7 shows a relative position of the marker A and the marker B. This relative position may be with respect to the GNSS position or may be with respect to the vehicle 100.

Hereinafter, referring to FIG. 8, the marker positional deviation determination by the vehicle control device 200 will be described. In the control process of the positional deviation determination illustrated in FIG. 8, for example, "marker A" indicates the marker 304a of FIG. 7, and "marker B" indicates the marker 304b of FIG. 7. The relative position of the marker A and the marker B is stored in advance in the storage unit 204. In addition, the relative position may be coordinates or a distance.

Since steps S801 to S804 are equal to the above-described steps S501 to S504, repeated description will be omitted. If it is determined that the marker A has been detected in step S804, the control process moves to step S805. If it is determined that the marker A has not been detected in step S804, the control process moves to step S810.

In step S805, the vehicle behavior modification unit 210 controls the speed or steering of the vehicle 100. Since the marker A has already been detected, the vehicle behavior modification unit 210 controls the speed or steering of the vehicle 100 so as to be able to detect the marker B. The control of the speed or steering performed in step S805 may be the same control amount as the control performed in step S803. Specifically, the vehicle behavior modification unit 210 controls, for example, a target acceleration or a target steering angle in the same manner as in step S803.

In addition, in the control of the speed or steering performed in step S805, the control amount may be greater than that in the control performed in step S803. Specifically, the vehicle behavior modification unit 210 may increase the target acceleration for acceleration or increase the target steering angle for traveling. However, increasing the target acceleration may lead to a possibility that the vehicle may pass by the marker B and the marker B may not be detected, and thus it is not desirable to increase the target acceleration. In addition, when the position of the host vehicle is away from the marker B or when it is expected that the host vehicle will collide with an obstacle, it is desirable to increase the target steering angle and control the host vehicle to approach the marker B.

In addition, in the control of the speed or steering performed in step S805, the control amount may be smaller than that in the control performed in step S803. Specifically, the vehicle behavior modification unit 210 may decrease the target acceleration for deceleration or decrease the target steering angle for traveling. In consideration of the possibility that the marker B may not be detected due to a high host vehicle speed, it is desirable to decrease the target acceleration so as to be able to detect the marker B. In addition, when the position of the host vehicle is close to the marker B, the vehicle behavior modification unit 210 need not modify the target steering angle, but since the host vehicle may collide with the obstacle, the vehicle behavior modification unit 210 may decrease the target steering angle to avoid collision with the obstacle.

In step S806, the vehicle control device 200 determines whether or not the marker B has been detected, on the basis of the detection result obtained by the marker detection unit 206. If the vehicle control device 200 determines that the marker B has been detected, the control process moves to step S807. If the vehicle control device 200 determines that the marker B has not been detected, the control process moves to step S810.

In step S807, the computing unit 203 calculates a relative position AB of the marker A and the marker B, on the basis of the detected position of the marker A and the detected position of the marker B. The relative position may be with respect to the GNSS position or may be with respect to the host vehicle. In addition, the relative position may be coordinates or a distance.

The storage unit 204 may store the relative position AB calculated by the computing unit 203 by overwriting the stored relative position or, when there is a sufficient memory capacity, by adding as a newly-calculated relative position without overwriting. When there is no sufficient memory capacity, the storage unit 204 may successively delete the oldest relative position among the stored relative positions. When the stored relative position is deleted, it is desirable that the vehicle control device 200 notify the driver via the notification device 118. The relative position to be stored by overwriting or by adding includes the calculated relative position AB. Further, the individual positions of the detected marker A and marker B may be newly stored.

In step S808, the positional deviation determination unit 208 determines whether the calculated relative position AB is undisplaced from the relative position (the stored relative position) stored in the storage unit 204. If the positional deviation determination unit 208 determines that the calculated relative position AB is undisplaced, the control process moves to step S809. If the positional deviation determination unit 208 determines that the calculated relative position AB is displaced, the control process moves to step S810. The stored relative position may be with respect to the GNSS position or may be with respect to the host vehicle. In addition, as for the stored relative position, the marker can also be stored in the storage unit 204 manually by the driver or a passenger. In addition, the stored relative position may be coordinates or a distance.

In step S809, the vehicle control device 200 determines that there is no positional deviation. In this case, the vehicle control device 200 starts low-speed autonomous driving, and notifies the driver or the like that the low-speed autonomous driving is started via the notification device 118. At this time, the vehicle control device 200 may not start the low-speed autonomous driving, but may continue manual driving.

In step S810, the vehicle control device 200 determines that the positional deviation has occurred. In this case, the vehicle control device 200 does not start the low-speed autonomous driving, and notifies the driver or the like that the low-speed autonomous driving cannot be stared via the notification device 118. Note that, for example, when the occurrence of the positional deviation was caused intentionally by the driver or the passenger, the vehicle control device 200 may notify the driver or the like via the notification device 118, and store such information in the storage unit 204. When such information is stored in the storage unit 204, the information may be stored by overwriting or by adding.

Through the above-described control process, a series of the positional deviation determination process ends. Note that the stored relative position related to the positional deviation determination process and the relative position calculated by the computing unit 203 may be deleted or added later by the driver.

Figure 8:
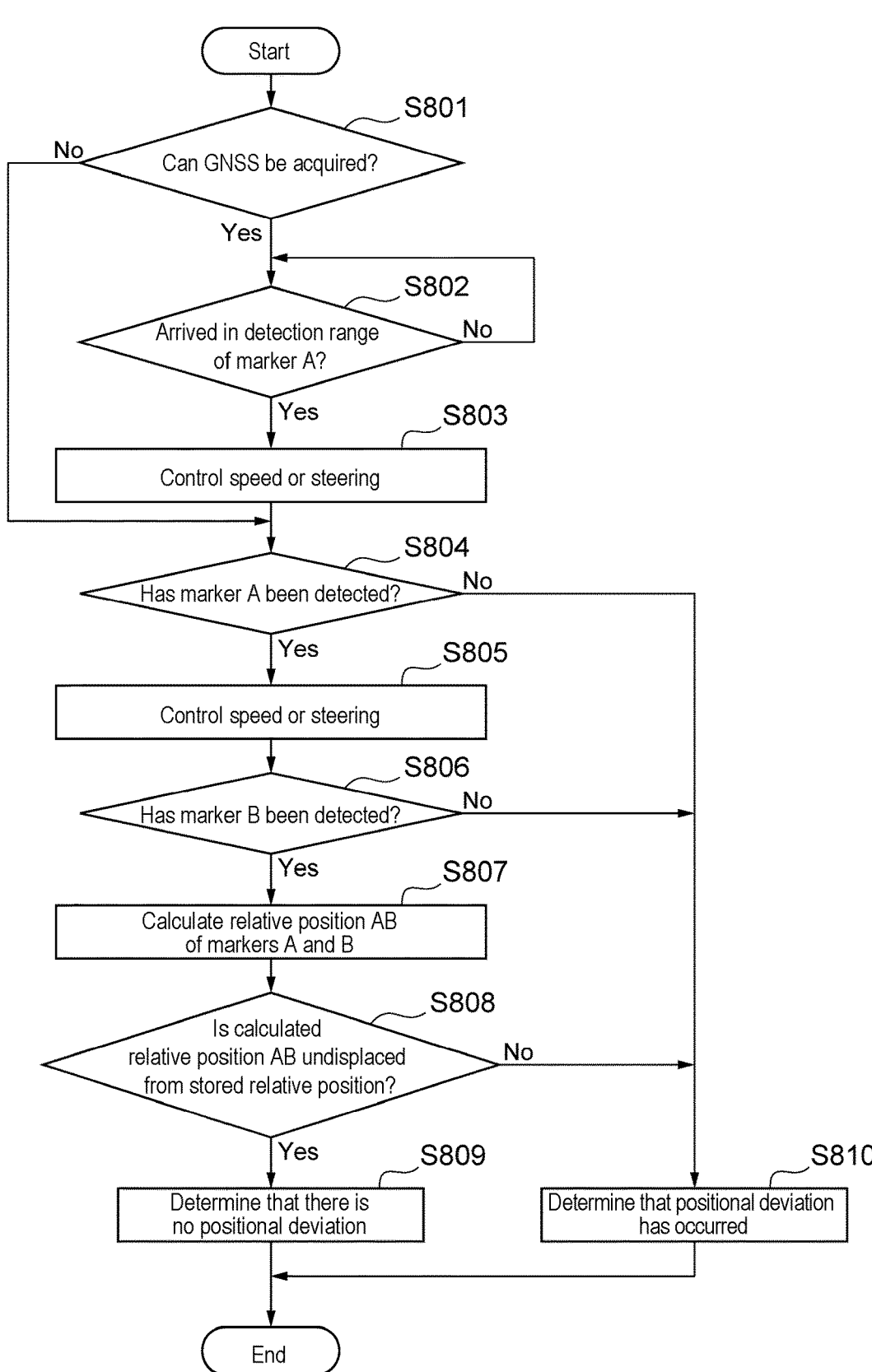
FIG. 8 is a flowchart of marker positional deviation determination by the vehicle control device.

FIG. 9 is a time chart of the positional deviation determination process illustrated in FIG. 8. As illustrated in FIG. 9, the scene before a time t1 is a scene of traveling in a state where the marker A is not detected. The time t1 is a timing at which the marker A is detected, and a timing at which a marker A detection flag is turned ON. At this time, the vehicle behavior modification unit 210 modifies the vehicle behavior. Specifically, the vehicle behavior modification unit 210 sets the maximum speed and performs steering assist and also turns ON a maximum speed setting flag and a steering assist flag.

At this time, if GNSS position information has already been acquired in the scene before the time t1, as described above, the control amount of the speed or steering may be constant or may be increased or decreased from the above-described control amount of the speed or steering. At or after the time t1 is a scene of traveling in a state where the vehicle behavior is controlled.

A time t2 is a timing at which the marker B is detected, and a timing at which a marker B detection flag is turned ON. At this time, the computing unit 203 calculates a relative position AB of the marker A and the marker B. Then, the positional deviation determination unit 208 determines whether there is a positional deviation by comparing the calculated relative position AB with the stored relative position. If the positional deviation determination unit 208 determines that there is a positional deviation (that is, the positional deviation has occurred), the vehicle control device 200 turns ON a marker positional deviation occurrence flag.

Figure 10:
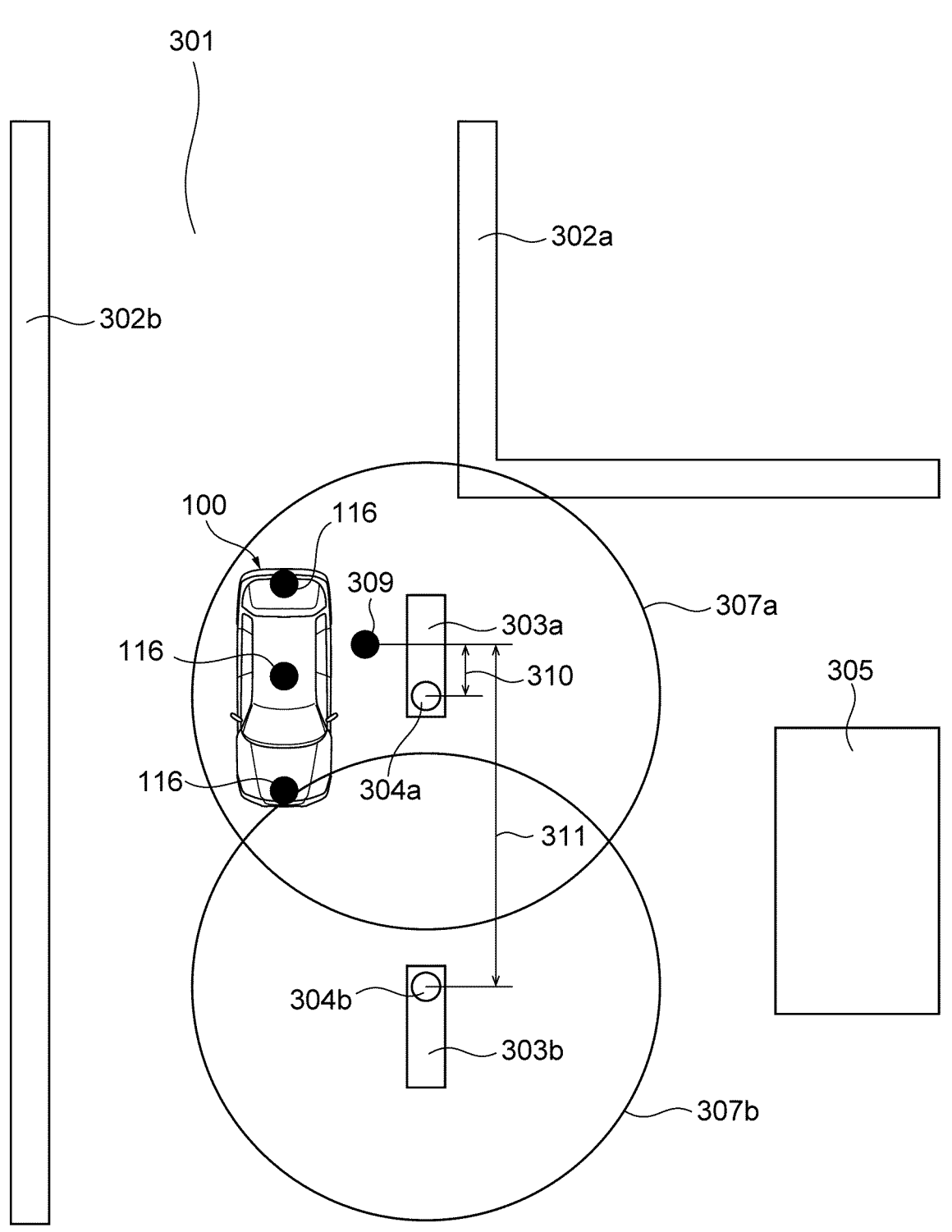
FIG. 10 is view for describing a relative position of a landmark and a marker.

Hereinafter, referring to FIG. 10, a relative position of a landmark and a marker will be described. The reference sign 309 in FIG. 10 shows a landmark placed in the vicinity of the markers 304a and 304b. The landmark 309 may be a home gate, a fence in the vicinity of the home, a home mailbox, a name plate, a white line, a mark, or the like.

In addition, the reference sign 310 in FIG. 10 shows a relative position of the marker 304a and the landmark 309, and the reference sign 311 shows a relative position of the marker 304b and the landmark 309. These relative positions may be with respect to the GNSS position or may be with respect to the host vehicle.

Figure 11:
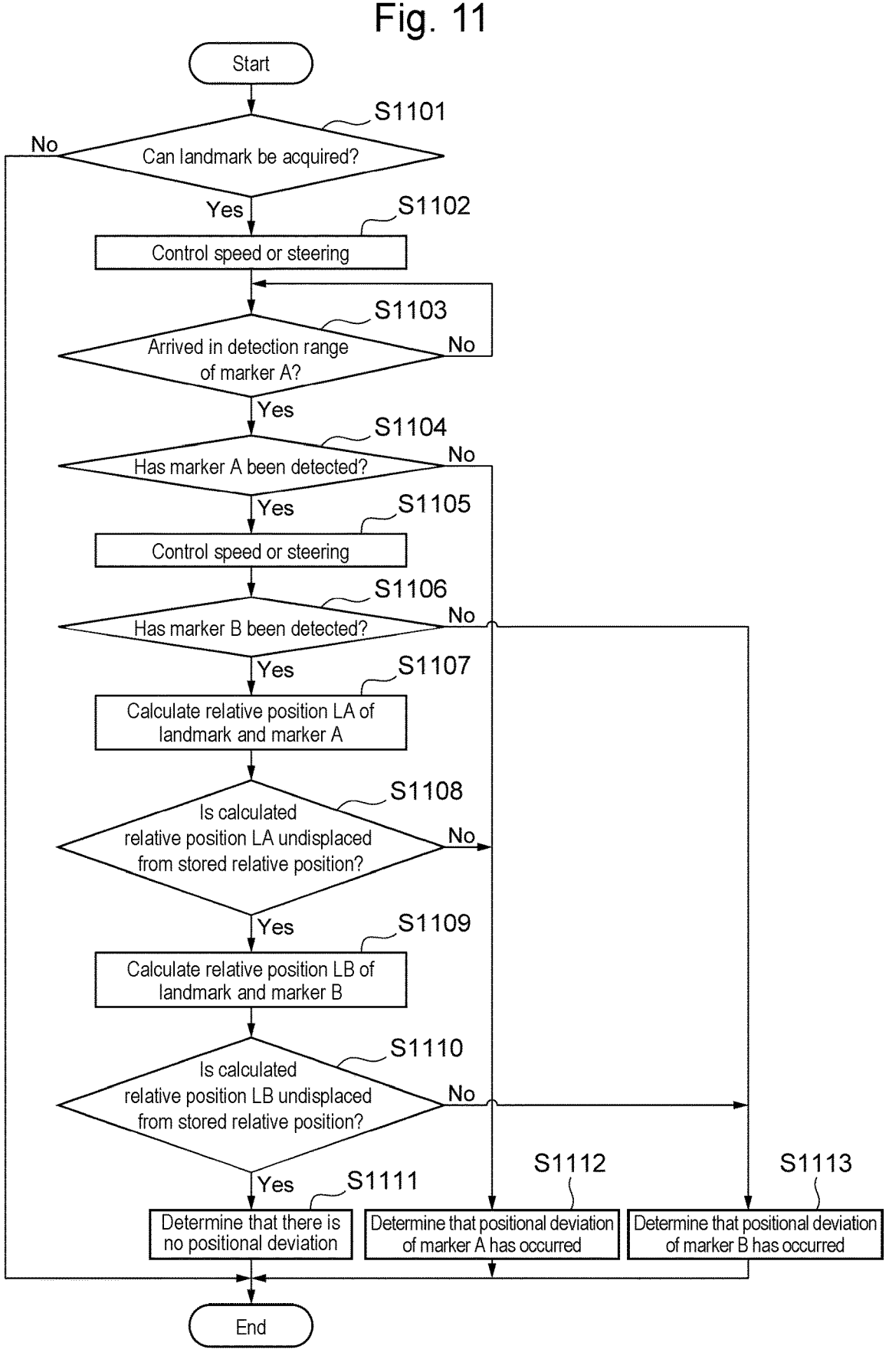
FIG. 11 is a flowchart of marker positional deviation determination by the vehicle control device.

Hereinafter, referring to FIG. 11, the marker positional deviation determination by the vehicle control device 200 will be described. The control process of the positional deviation determination illustrated in FIG. 11 is different from the control processes illustrated in FIG. 5 and FIG. 8 in that the relative position of the landmark and the marker A is used. In addition, in FIG. 11, for example, "marker A" indicates the marker 304a of FIG. 10, "marker B" indicates the marker 304b of FIG. 10, and "landmark" indicates the landmark 309 of FIG. 10. The relative position of the landmark and the marker A and the relative position of the landmark and the marker B are stored in the storage unit 204, and the relative position may be coordinates or a distance. In the control process illustrated in FIG. 11, the GNSS position or GNSS may or may not be acquired.

First, in step S1101, the vehicle control device 200 determines whether or not the position of the landmark can be acquired, on the basis of at least one of the result obtained by the image sensor 112 or the result obtained by the range sensor 113. If the vehicle control device 200 determines that the position of the landmark can be acquired, the control process moves to step S1102. Meanwhile, if the vehicle control device 200 determines that the position of the landmark cannot be acquired, the control process ends.

In step S1102, the vehicle behavior modification unit 210 controls the speed or steering of the vehicle 100 so as to be able to detect the marker A as described above.

In step S1103, the vehicle arrival determination unit 205 determines whether or not the host vehicle has arrived in the detection range of the marker A, on the basis of the position of the host vehicle estimated by the host vehicle position estimation unit 201 and on the basis of the position and the detection range of the marker A stored in the storage unit 204. If the vehicle arrival determination unit 205 determines that the host vehicle has arrived in the detection range of the marker A, the control process moves to step S1104. If the vehicle arrival determination unit 205 determines that the host vehicle has not arrived in the detection range of the marker A, the control process in step S1103 is repeated.

In step S1104, the vehicle control device 200 determines whether or not the marker A has been detected, on the basis of the detection result obtained by the marker detection unit 206. If the vehicle control device 200 determines that the marker A has been detected, the control process moves to step S1105. If the vehicle control device 200 determines that the marker A has not been detected, the control process moves to step S1112.

In step S1105, the vehicle behavior modification unit 210 controls the speed or steering of the vehicle 100. Since marker A has already been detected, the vehicle behavior modification unit 210 controls the speed or steering of the vehicle 100 so as to be able to detect the marker B. The control of the speed or steering performed in step S1105 may be the same control amount as the control performed in step S1102 or may be increased or decreased from the control performed in step S1102.

In step S1106, the vehicle control device 200 determines whether or not the marker B has been detected, on the basis of the detection result obtained by the marker detection unit 206. If the vehicle control device 200 determines that the marker B has been detected, the control process moves to step S1107. If the vehicle control device 200 determines that the marker B has not been detected, the control process moves to step S1113.

In step S1107, the computing unit 203 calculates a relative position LA of the landmark and the marker A, on the basis of the acquired position of the landmark and the detected position of the marker A.

In step S1108, the positional deviation determination unit 208 determines whether the calculated relative position LA is undisplaced from the relative position (the stored relative position) of the landmark and the marker A stored in the storage unit 204. If the positional deviation determination unit 208 determines that the calculated relative position LA is undisplaced, the control process moves to step S1109. If the positional deviation determination unit 208 determines that the calculated relative position LA is displaced, the control process moves to step S1112. Note that the calculated relative position and the stored relative position may be a relative distance or coordinates. The coordinates may be based on the GNSS position or may be based on the host vehicle.

Step S1108 is different from step S808 of FIG. 8. Step S808 uses the relative position of the marker A and the marker B. In this case, the relative position with respect to the host vehicle may have a possibility that a positional deviation cannot be determined if both of the marker A and the marker B are displaced in the same direction. In contrast, step S1108 calculates a relative position of the fixed landmark and the marker A and compares the calculated relative position with the stored relative position, and thus displacement of the marker A can be identified.

In step S1109, the computing unit 203 calculates a relative position LB of the landmark and the marker B, on the basis of the acquired position of the landmark and the detected position of the marker B.

In step S1110, the positional deviation determination unit 208 determines whether the calculated relative position LB is undisplaced from the relative position (the stored relative position) of the landmark and the marker B stored in the storage unit 204. If the positional deviation determination unit 208 determines that the calculated relative position LB is undisplaced, the control process moves to step S1111. If the positional deviation determination unit 208 determines that the calculated relative position LB is displaced, the control process moves to step S1113. Note that the calculated relative position and the stored relative position may be a relative distance or coordinates. The coordinates may be based on the GNSS position or may be based on the host vehicle. Like the above-described step S1108, step S1110 uses the fixed landmark, and thus a positional deviation of the marker B can be identified.

In step S1111, the vehicle control device 200 determines that there is no positional deviation of the marker A and the marker B. If there is no positional deviation of the marker A and the marker B, the vehicle control device 200 starts autonomous driving or driving assistance.

In step S1112, the vehicle control device 200 determines that there is a positional deviation of the marker A.

In step S1113, the vehicle control device 200 determines that there is a positional deviation of the marker B.

In either step S1112 or step S1113, the vehicle control device 200 notifies the driver or the like of the marker positional deviation via the notification device 118. After the notification, the marker positional deviation may be stored in the storage unit by overwriting or by adding according to a driver's selection. The driver's selection is made by a touch on the display of the display 119 or by a press on a button displayed. Further, the driver may use a means such as sound for selection. Further, the selection by the driver may be at a timing of step S1112 and step S1113 where the marker positional deviation is determined, may be after the end of the positional deviation detection process, or may be after the host vehicle is stopped in a commercial facility or a home garden. Further, the selection by the driver may be at a timing at which the host vehicle, once powered OFF, is powered ON next time.

Figure 12:
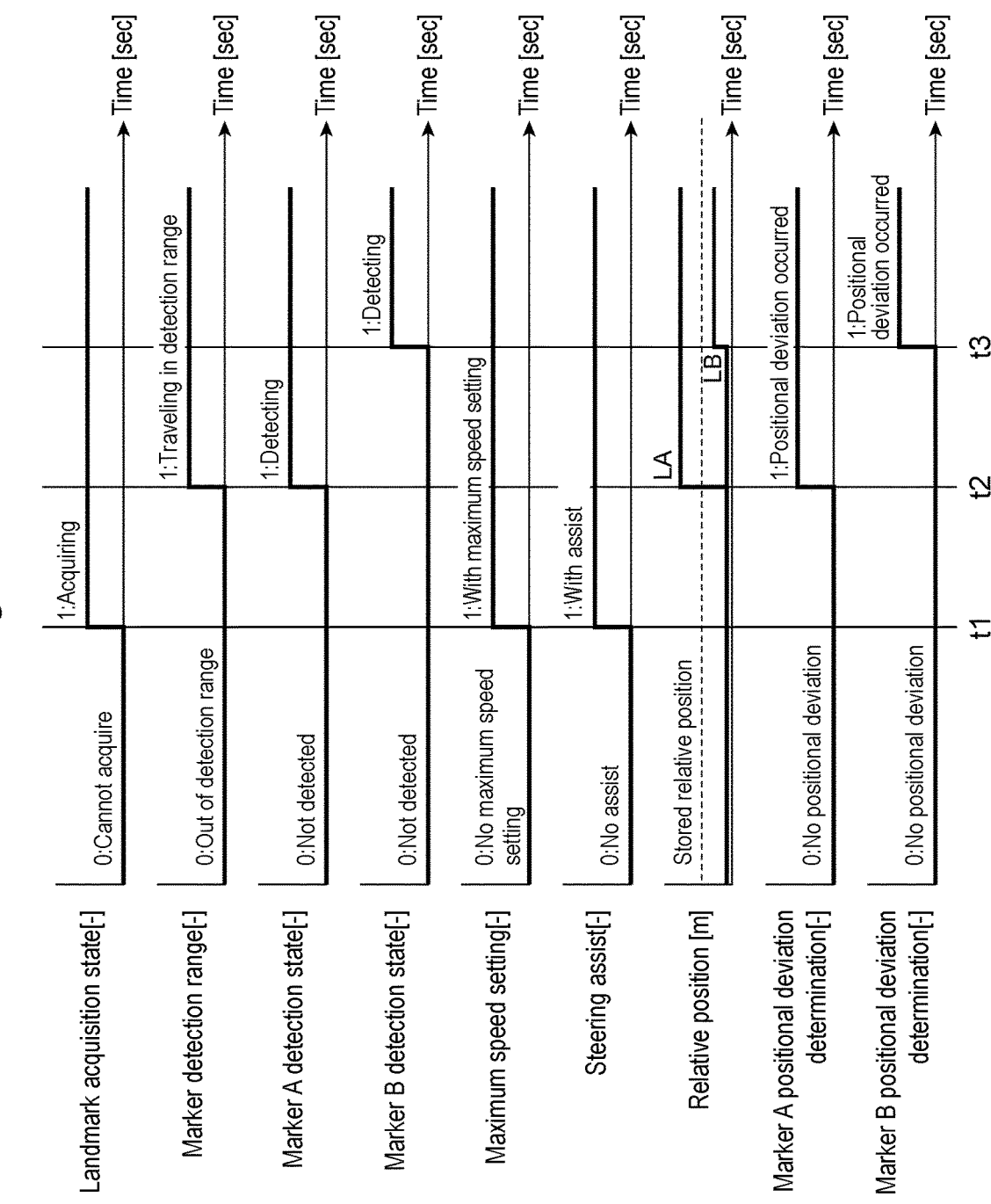
FIG. 12 is a time chart of the positional deviation determination process illustrated in FIG. 11.

FIG. 12 is a time chart of the positional deviation determination process illustrated in FIG. 11. As illustrated in FIG. 12, the scene before a time t1 is a scene of traveling in a state where the position of the landmark is not being acquired. At this time, the GNSS position may or may not be acquired. Though not illustrated, when the GNSS can be acquired, the vehicle control device 200 may modify the vehicle behavior when the vehicle arrives near the stored landmark. The vehicle control device 200 may modify the vehicle behavior during the autonomous driving and during the manual driving with the above-described methods.

The time t1 is a timing at which the position of the landmark is acquired and a position acquisition flag of the landmark is turned ON. At this time, the vehicle behavior modification unit 210 modifies the vehicle behavior so as to be able to detect the marker A. Specifically, the vehicle control device 200 sets the maximum speed and performs steering assist and also turns ON a maximum speed setting flag and a steering assist flag.

A time t2 is a timing at which the marker A is detected, and a timing at which a marker A detection flag is turned ON. At this time, the computing unit 203 calculates a relative position LA of the landmark and the marker A. Then, the positional deviation determination unit 208 determines whether there is a positional deviation of the marker A by comparing the calculated relative position LA with the stored relative position. If the positional deviation determination unit 208 determines that there is a positional deviation, the vehicle control device 200 turns ON a positional deviation occurrence flag of the marker A. Note that the relative position LA of the landmark and the marker A may be a calculated relative distance, or may be coordinates based on the GNSS position or coordinates based on the host vehicle.

At this time, the vehicle behavior modification unit 210 modifies the vehicle behavior so as to be able to detect the marker B. The control of the speed or steering performed herein may be the same control amount as the control performed at the timing of the time t1 or may be increased or decreased from the control performed at the timing of the time t1.

A time t3 is a timing at which the marker B is detected, and a timing at which a marker B detection flag is turned ON. At this time, the computing unit 203 calculates a relative position LB of the landmark and the marker B. Then, the positional deviation determination unit 208 determines whether there is a positional deviation of the marker B by comparing the calculated relative position LB with the stored relative position. If the positional deviation determination unit 208 determines that there is a positional deviation, the vehicle control device 200 turns ON a positional deviation occurrence flag of the marker B. Note that the relative position LB of the landmark and the marker B may be a calculated relative distance, or may be coordinates based on the GNSS position or coordinates based on the host vehicle.

If it is determined that there is a positional deviation and the autonomous driving is performed, the vehicle control device 200 stops the vehicle 100. In this case, the vehicle control device 200 may stop the autonomous driving not to start the autonomous driving or may cancel the steering assist.

The following describes an example of determining whether there is a marker positional deviation, on the basis of the number of markers in an actual environment, how many markers the host vehicle is detecting, whether there is physically a marker positional deviation, and how the markers (in the case of two or more markers) are displaced from their original positions. In the following description, out of the plurality of markers, a marker placed using a screw, a jig, or the like will be referred to as the "master marker" or "fixed master marker," and a marker placed using a simple method, such as a gummed tape, will be referred to as the "sub marker" or "unfixed sub marker."

Consider a scene where, for example, the number of markers is 1, and the host vehicle is detecting zero markers.

In this case, a relative position of markers cannot be acquired, and thus there is no need of positional deviation determination.

Consider a scene where the number of markers is 1, the host vehicle is detecting one marker, and physically the one marker is not displaced. In this case, there is no need of positional deviation determination.

Consider a scene where the number of markers is 1, the host vehicle is detecting one marker, and physically the one marker is displaced. In this case, since the host vehicle is detecting only one marker, it is impossible to determine whether a positional deviation has occurred by comparison of the relative position with respect to the marker detection unit 206 of the host vehicle. However, it is possible to compare with the above-described GNSS position or relative position with respect to the landmark. At this time, the position of the marker can be stored by notifying the driver of whether to store it by overwriting or by adding via the notification device 118.

Consider a scene where the number of markers is 2, one of which is a fixed master marker, and the host vehicle is detecting zero markers. In this case, a relative position of markers cannot be acquired, and thus there is no need of positional deviation determination.

Consider a scene where the number of markers is 2, one of which is a fixed master marker, and the host vehicle is detecting one marker. In this case, since the master marker is fixed, there is no need of positional deviation determination.

Consider a scene where the number of markers is 2, one of which is a fixed master marker, the host vehicle is detecting one sub marker, not a master marker, and the one sub marker is not displaced. In this case, there is no need of positional deviation determination.

Consider a scene where the number of markers is 2, one of which is a fixed master marker, the host vehicle is detecting one sub marker, not a master marker, and the one sub marker is displaced. In this case, since the host vehicle is detecting only one sub marker, positional deviation occurrence determination cannot be made, but comparison with the above-described GNSS position or relative position with respect to the landmark can be performed.

Consider a scene where the number of markers is 2, one of which is a fixed master marker, the host vehicle is detecting two markers, that is, one master marker and one sub marker, and the one sub marker is not displaced. In this case, there is no need of positional deviation determination.

Consider a scene where the number of markers is 2, one of which is a fixed master marker, the host vehicle is detecting two markers, that is, one master marker and one sub marker, and the one sub marker is displaced. In this case, since the host vehicle is detecting two markers and a relative position of the markers can be calculated and compared with the stored relative position, positional deviation occurrence determination is made.

Consider a scene where the number of markers is 2, both of which are unfixed sub markers, and the host vehicle is detecting zero markers. In this case, a relative position of markers cannot be acquired, and thus there is no need of positional deviation determination.

Consider a scene where the number of markers is 2, both of which are unfixed sub markers, the host vehicle is detecting one sub marker, and the sub marker is not displaced. In this case, there is no need of positional deviation determination.

Consider a scene where the number of markers is 2, both of which are unfixed sub markers, the host vehicle is detecting one sub marker, and the sub marker is displaced. In this case, since the host vehicle is detecting only one sub marker, positional deviation occurrence determination cannot be made, but comparison with the above-described GNSS position or relative position with respect to the landmark can be performed.

Consider a scene where the number of markers is 2, both of which are unfixed sub markers, the host vehicle is detecting two sub markers, and the two sub markers are not displaced. In this case, there is no need of positional deviation determination.

Consider a scene where the number of markers is 2, both of which are unfixed sub markers, the host vehicle is detecting two sub markers, and one sub marker is displaced. In this case, positional deviation occurrence determination can be made by calculating a relative position of the sub markers. However, since it is impossible to identify which of the two detected markers is displaced, in this case, the displaced marker can be identified by comparison with the above-described GNSS position or relative position with respect to the landmark.

Consider a scene where the number of markers is 2, both of which are unfixed sub markers, the host vehicle is detecting two sub markers, and the two sub markers are displaced in the same direction. In this case, since the relative position of the sub markers is equal to the stored relative position, positional deviation occurrence determination cannot be made. However, in this case, the displaced marker can be identified by comparison with the above-described GNSS position or relative position with respect to the landmark.

Consider a scene where the number of markers is 2, both of which are unfixed sub markers, the host vehicle is detecting two sub markers, and the two sub markers are displaced in different directions. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

Consider a scene where the number of markers is 3, one of which is a fixed marker, and the host vehicle is detecting zero markers. In this case, a relative position of markers cannot be acquired, and thus there is no need of positional deviation determination.

Consider a scene where the number of markers is 3, one of which is a fixed master marker, and the host vehicle is detecting one master marker. In this case, since the master marker is fixed, there is no need of positional deviation determination.

Consider a scene where the number of markers is 3, one of which is a fixed master marker, the host vehicle is detecting one sub marker, not a master marker, and the one sub marker is not displaced. In this case, there is no need of positional deviation determination.

Consider a scene where the number of markers is 3, one of which is a fixed master marker, the host vehicle is detecting one sub marker, not a master marker, and the one sub marker is displaced. In this case, since the host vehicle is detecting only one sub marker, positional deviation occurrence determination cannot be made, but comparison with the above-described GNSS position or relative position with respect to the landmark can be performed.

Consider a scene where the number of markers is 3, one of which is a fixed master marker, the host vehicle is detecting one master marker and one sub marker, and none of the markers is displaced. In this case, there is no need of positional deviation determination.

Consider a scene where the number of markers is 3, one of which is a fixed master marker, the host vehicle is detecting one master marker and one sub marker, and the one sub marker is displaced. In this case, since a relative position of the master marker and the sub marker can be calculated and compared with the stored relative position, positional deviation occurrence determination can be made. In this case, since the fixed master marker is used, a positional deviation of the sub marker can be identified.

Consider a scene where the number of markers is 3, one of which is a fixed master marker, the host vehicle is detecting two sub markers, and the two sub markers are not displaced. In this case, there is no need of positional deviation determination.

Consider a scene where the number of markers is 3, one of which is a fixed master marker, the host vehicle is detecting two sub markers, and one sub marker is displaced. In this case, positional deviation occurrence determination can be made by calculating a relative position of the sub markers. However, since it is impossible to identify which of the two detected markers is displaced, in this case, the displaced marker can be identified by comparison with the above-described GNSS position or relative position with respect to the landmark.

Consider a scene where the number of markers is 3, one of which is a fixed master marker, the host vehicle is detecting two sub markers, and the two sub markers are displaced in the same direction. In this case, since the relative position of the sub markers is equal to the stored relative position, positional deviation occurrence determination cannot be made. However, in this case, the displaced marker can be identified by comparison with the above-described GNSS position or relative position with respect to the landmark.

Consider a scene where the number of markers is 3, one of which is a fixed master marker, the host vehicle is detecting two sub markers, and the two sub markers are displaced in different directions. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

Consider a scene where the number of markers is 3, one of which is a fixed master marker, the host vehicle is detecting one master marker and two sub markers, and the markers are not displaced. In this case, there is no need of positional deviation determination.

Consider a scene where the number of markers is 3, one of which is a fixed master marker, the host vehicle is detecting one master marker and two sub markers, and one sub marker is displaced. In this case, positional deviation occurrence determination can be made by calculating a relative position of the sub markers. In this case, since the fixed master marker is used, a positional deviation of the sub marker can be identified.

Consider a scene where the number of markers is 3, one of which is a fixed master marker, the host vehicle is detecting one master marker and two sub markers, and the two sub markers are displaced in the same direction. In this case, positional deviation occurrence determination can be made by calculating a relative position of the sub markers.

In this case, since the fixed master marker is used, a positional deviation of the sub marker can be identified.

Consider a scene where the number of markers is 3, one of which is a fixed master marker, the host vehicle is detecting one master marker and two sub markers, and the two sub markers are displaced in different directions. In this case, positional deviation occurrence determination can be made by calculating a relative position of the sub markers. In this case, since the fixed master marker is used, a positional deviation of the sub marker can be identified.

Consider a scene where the number of markers is 3, two of which are fixed markers, and the host vehicle is detecting zero markers. In this case, a relative position of markers cannot be acquired, and thus there is no need of positional deviation determination.

Consider a scene where the number of markers is 3, two of which are fixed master markers, and the host vehicle is detecting one master marker. In this case, since the master marker is fixed, there is no need of positional deviation determination.

Consider a scene where the number of markers is 3, two of which are fixed markers, the host vehicle is detecting one sub marker, not a master marker, and the one sub marker is not displaced. In this case, there is no need of positional deviation determination.

Consider a scene where the number of markers is 3, two of which are fixed master markers, the host vehicle is detecting one sub marker, not a master marker, and the one sub marker is displaced. In this case, since the host vehicle is detecting only one sub marker, positional deviation occurrence determination cannot be made, but comparison with the above-described GNSS position or relative position with respect to the landmark can be performed.

Consider a scene where the number of markers is 3, two of which are fixed master markers, the host vehicle is detecting one master marker and one sub marker, and the sub marker is not displaced. In this case, there is no need of positional deviation determination.

Consider a scene where the number of markers is 3, two of which are fixed master markers, the host vehicle is detecting one master marker and one sub marker, and the sub marker is displaced. In this case, positional deviation occurrence determination can be made by calculating a relative position of the sub markers. In this case, since the fixed master marker is used, a positional deviation of the sub marker can be identified.

Consider a scene where the number of markers is 3, two of which are fixed markers, and the host vehicle is detecting two master markers. In this case, there is no need of positional deviation determination.

Consider a scene where the number of markers is 3, two of which are fixed master markers, and the host vehicle is detecting two master markers and one sub marker. In this case, positional deviation occurrence determination can be made by calculating a relative position of the sub markers. In this case, since the fixed master marker is used, a positional deviation of the sub marker can be identified.

Consider a scene where the number of markers is 3, the three markers are placed at any positions, and the host vehicle is detecting zero markers. In this case, a relative position of markers cannot be acquired, and thus there is no need of positional deviation determination.

Consider a scene where the number of markers is 3, three markers are placed at any positions, the host vehicle is detecting one sub marker, and the one sub marker is not displaced. In this case, there is no need of positional deviation determination.

Consider a scene where the number of markers is 3, the three markers are placed at any positions, the host vehicle is detecting one sub marker, and the one sub marker is displaced. In this case, since the host vehicle is detecting only one sub marker, positional deviation occurrence determination cannot be made, but comparison with the above-described GNSS position or relative position with respect to the landmark can be performed.

Consider a scene where the number of markers is 3, the three markers are placed at any positions, the host vehicle is detecting two sub markers, and the two sub markers are not displaced. In this case, there is no need of positional deviation determination.

Consider a scene where the number of markers is 3, the three markers are placed at any positions, the host vehicle is detecting two sub markers, and one sub marker is displaced. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

Consider a scene where the number of markers is 3, the three markers are placed at any positions, the host vehicle is detecting two sub markers, and the two sub markers are displaced in the same direction. In this case, since the relative position of the sub markers is equal to the stored relative position, positional deviation occurrence determination cannot be made. However, in this case, the displaced marker can be identified by comparison with the above-described GNSS position or relative position with respect to the landmark.

Consider a scene where the number of markers is 3, the three markers are placed at any positions, the host vehicle is detecting two sub markers, and the two sub markers are displaced in different directions. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

Consider a scene where the number of markers is 3, the three markers are placed at any positions, the host vehicle is detecting three sub markers, and the three sub markers are not displaced. In this case, there is no need of positional deviation determination.

Consider a scene where the number of markers is 3, the three markers are placed at any positions, the host vehicle is detecting three sub markers, and one sub marker is displaced. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

Consider a scene where the number of markers is 3, the three markers are placed at any positions, the host vehicle is detecting three sub markers, and two sub markers are displaced in the same direction. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

Consider a scene where the number of markers is 3, the three markers are placed at any positions, the host vehicle is detecting three sub markers, and two sub markers are displaced in different directions. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

Consider a scene where the number of markers is 3, the three markers are placed at any positions, the host vehicle is detecting three sub markers, and the three sub markers are displaced in the same direction. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

Consider a scene where the number of markers is 3, the three markers are placed at any positions, the host vehicle is detecting three sub markers, and the three sub markers are displaced in different directions. In this case, since the relative position of the sub markers is different from the stored relative position, positional deviation occurrence determination can be made. However, since it is impossible to identify which of the two detected markers is displaced, in this case, the displaced marker can be identified by comparison with the above-described GNSS position or relative position with respect to the landmark.

In the vehicle control device 200 with the foregoing configuration, the vehicle behavior modification unit 210 modifies the vehicle behavior such that the marker detection unit 206 detects a marker, and thus the marker detection unit 206 can more smoothly detect a marker. In addition, the positional deviation determination unit 208 determines whether there is a marker positional deviation, on the basis of the position of the marker detected by the marker detection unit 206 and the position of the marker stored in the storage unit 204, and thus if there is a positional deviation of the marker, the positional deviation determination unit 208 can detect the positional deviation. Accordingly, the vehicle control device 200 can avoid erroneous operation of the vehicle 100 caused by the marker positional deviation.

Note that in the foregoing embodiment, the example of the positional deviation determination using the relative position of the markers (that is, between the markers) or the relative position of the marker and the landmark has been described. However, the relative distance between the markers or the relative distance between the marker and the landmark may be used.

Although the embodiment of the present invention has been described in detail above, the present invention is not limited to the above embodiment, and various design changes are possible in so far as they are within the spirit of the present invention in the scope of the claims.

REFERENCE SIGNS LIST

100 Vehicle
111 Wheel speed sensor

112 Image sensor
113 Range sensor
114 Position detection device
115 Input switch unit
116 Radio wave receiver
117 Actuator ECU
118 Notification device
119 Display
120 Sound output unit
200 Vehicle control device
201 Host vehicle position estimation unit
202 External recognition unit
203 Computing unit
204 Storage unit
205 Vehicle arrival determination unit
206 Marker detection unit
207 Route generation unit
208 Positional deviation determination unit
210 Vehicle behavior modification unit
211 Target acceleration computing unit
212 Target steering angle computing unit
213 Accelerator pedal control unit
214 Brake pedal control unit
215 Steering control unit

The invention claimed is:

1. A vehicle control device comprising:
a storage unit to store a first relative position or relative distance between a plurality of wireless transmitters placed separately from each other by a predetermined distance; and
a processor configured to execute one or more operations to:
receive, using a radio wave receiver provided in a host vehicle, a radio wave from a wireless transmitter, of the plurality of wireless transmitters, placed at a predetermined point to detect the wireless transmitter;
modify a vehicle behavior to detect the wireless transmitter;
calculate a second relative position or relative distance between the wireless transmitters based on a detected position of each wireless transmitter; and
determine whether there is a positional deviation of a wireless transmitter, based on the second relative position or relative distance between the wireless transmitters and the first relative position or relative distance between the wireless transmitters stored in the storage unit.

2. The vehicle control device according to claim 1, wherein the storage unit stores a detection range of a wireless transmitter;
wherein the processor is further configured to execute one or more operations to:
estimate a position of the host vehicle based on a detection result obtained by a position detection device provided in the vehicle;
determine whether or not the host vehicle has arrived in the detection range of the wireless transmitter stored in the storage unit, based on the position of the host vehicle; and
modify, in response to a determination that the host vehicle has arrived in the detection range, the vehicle behavior to detect the wireless transmitter.

3. The vehicle control device according to claim 2, wherein the processor is further configured to execute one or more operations to determine that there is a positional deviation of the wireless transmitter, in response to a determination that the host vehicle has arrived in the detection range of the wireless transmitter and the wireless transmitter has not been detected.

4. The vehicle control device according to claim 1, wherein the processor is further configured to execute one or more operations to control at least one of a speed or steering angle of the host vehicle.

5. The vehicle control device according to claim 1, wherein the storage unit stores a calculated result.

6. The vehicle control device according to claim 1, wherein the processor is further configured to execute one or more operations to:

detect, using an external environment sensor provided in the host vehicle, an object placed near the wireless transmitter to recognize the object, wherein the storage unit stores a relative position of the wireless transmitter and the object or relative distance therebetween;

calculate the relative position of the wireless transmitter and the object or relative distance therebetween, based on the position of the detected wireless transmitter and based on a position of the detected object; and determine whether there is a positional deviation of the wireless transmitter, based on the calculated relative position of the wireless transmitter and the object or relative distance therebetween and based on the relative position of the wireless transmitter and the object or relative distance therebetween stored in the storage unit.

7. The vehicle control device according to claim 6, wherein the processor is further configured to execute one or more operations to: in response to a detection of the object, modify the vehicle behavior such that the host vehicle arrives in a detection range of the wireless transmitter.

* * * * *